(12) United States Patent
Miller

(10) Patent No.: US 8,285,202 B2
(45) Date of Patent: *Oct. 9, 2012

(54) CAPACITY MAXIMIZATION FOR A UNICAST SPOT BEAM SATELLITE SYSTEM

(75) Inventor: Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,278

(22) Filed: Aug. 25, 2011

(65) Prior Publication Data

US 2011/0306293 A1    Dec. 15, 2011

Related U.S. Application Data

(63) Continuation of application No. 12/176,629, filed on Jul. 21, 2008, now Pat. No. 8,010,043.

(60) Provisional application No. 60/951,178, filed on Jul. 20, 2007.

(51) Int. Cl.
*H04W 88/02* (2009.01)

(52) U.S. Cl. .................. 455/12.1; 455/13.2; 455/427

(58) Field of Classification Search ............ 455/12.1, 455/427, 13.2, 135, 13.4, 69, 426.1, 426.2, 455/428, 429, 430, 3.01, 3.02, 447, 422, 455/67.16, 134, 13.3; 370/316, 317, 333, 370/203, 335; 725/70, 63, 127

See application file for complete search history.

(56) References Cited

U.S. PATENT DOCUMENTS

| 6,684,071 | B1 | 1/2004 | Molnar et al. |
| 7,636,567 | B2 | 12/2009 | Karabinis et al. |
| 8,010,043 | B2 * | 8/2011 | Miller .................... 455/12.1 |
| 2002/0071384 | A1 * | 6/2002 | Hall et al. .................... 370/203 |
| 2005/0164701 | A1 | 7/2005 | Karabinis et al. |
| 2005/0272369 | A1 | 12/2005 | Karabinis et al. |

(Continued)

FOREIGN PATENT DOCUMENTS

WO    2009/015093 A1    1/2009

OTHER PUBLICATIONS

Notice of Allowance for U.S. Appl. No. 12/176,629 mailed on Jun. 28, 2011; 12 pages.

(Continued)

*Primary Examiner* — Tan Trinh

(74) *Attorney, Agent, or Firm* — Kilpatrick Townsend & Stockton LLP

(57) ABSTRACT

Methods, systems, and apparatuses are presented for improved satellite communications. The satellite system may comprises at least one gateway, a satellite in orbit configured to communicate with the at least one gateway and provide a plurality of spot beams, and a plurality of subscriber terminals. The spot beams may include a first spot beam to illuminate a first region and a second spot beam to illuminate a second region adjacent to and overlapping with the first region. The first spot beam as sent to at least one subscriber terminal may be affected by (1) interference from other signal sources including the second spot beam at a signal-to-interference ratio C/I and (2) noise at a signal-to-noise ratio C/N. Reception of signals from the first spot beam by the at least one of the first plurality of subscriber terminals may be interference-dominated such that C/I is less than C/N.

21 Claims, 23 Drawing Sheets

U.S. PATENT DOCUMENTS

| | | |
|---|---|---|
| 2006/0211371 A1 | 9/2006 | Karabinis et al. |
| 2007/0110098 A1* | 5/2007 | Hart et al. .................... 370/464 |
| 2007/0184849 A1* | 8/2007 | Zheng ....................... 455/456.1 |
| 2008/0008264 A1* | 1/2008 | Zheng .......................... 375/299 |
| 2009/0022086 A1 | 1/2009 | Dankberg et al. |
| 2009/0022087 A1 | 1/2009 | Dankberg et al. |
| 2009/0305697 A1 | 12/2009 | Karabinis et al. |
| 2009/0307727 A1 | 12/2009 | Thesling |
| 2010/0120419 A1* | 5/2010 | Zheng et al. ................. 455/427 |
| 2010/0184381 A1* | 7/2010 | Zheng et al. ................ 455/63.1 |
| 2010/0184427 A1* | 7/2010 | Zheng et al. ................. 455/427 |
| 2010/0203884 A1* | 8/2010 | Zheng et al. ................. 455/427 |
| 2010/0267330 A1* | 10/2010 | Kwentus et al. ............ 455/3.02 |
| 2011/0034166 A1* | 2/2011 | Karabinis et al. ............ 455/427 |

OTHER PUBLICATIONS

International Search Report and Written Opinion mailed on Oct. 22, 2008 for Patent Application No. PCT/US2008/070658, 7 pages.

* cited by examiner

| Modcode | Signal Quality Range (SNR) |
|---|---|
| QPSK 1/4 | Range 1 |
| QPSK 1/3 | Range 2 |
| QPSK 2/5 | Range 3 |
| QPSK 1/2 | Range 4 |
| QPSK 3/5 | Range 5 |
| QPSK 2/3 | Range 6 |
| QPSK 3/4 | Range 7 |
| QPSK 4/5 | Range 8 |
| QPSK 5/6 | Range 9 |
| QPSK 8/9 | Range 10 |
| QPSK 9/10 | Range 11 |
| 8PSK 3/5 | Range 12 |
| 8PSK 2/3 | Range 13 |
| 8PSK 3/4 | Range 14 |
| 8PSK 5/6 | Range 15 |
| 8PSK 8/9 | Range 16 |
| 8PSK 9/10 | Range 17 |
| 16APSK 2/3 | Range 18 |
| 16APSK 3/4 | Range 19 |
| 16APSK 4/5 | Range 20 |
| 16APSK 5/6 | Range 21 |
| 16APSK 8/9 | Range 22 |
| 16APSK 9/10 | Range 23 |
| 32APSK 3/4 | Range 24 |
| 32APSK 4/5 | Range 25 |
| 32APSK 5/6 | Range 26 |
| 32APSK 8/9 | Range 27 |
| 32APSK 9/10 | Range 28 |

FIG. 2B

| MAC Addr | SNR |
|---|---|
| MAC Addr 1 | A |
| MAC Addr 2 | B |
| MAC Addr 3 | C |
| MAC Addr 4 | D |
| MAC Addr 5 | E |
| MAC Addr 6 | F |
| MAC Addr 7 | G |
| ⋮ | ⋮ |
| MAC Addr $n$ | N |

FIG. 2C

| Design Name | # Colors | BW/Beam | # of GW's | TWT Power per Beam | # SL TWT's | Payload Aperture | Max PFD/Pole | Beam Spacing | SL X-over | Beam Capacity | Relative Comparison (wrt LF4) Capacity | TWT Power | SL BW | Cov. Area |
|---|---|---|---|---|---|---|---|---|---|---|---|---|---|---|
| LF1 (Basel'ne) | 4 | 500 MHz | 10 | 90W | 80 | 2.6m | -119 | 0.32° | -3.5 dB | 1.00 Gbps | 1.00 | 1.00 | 1.00 | 1.00 |
| LF1-Coverage1 | 1 | 2000 MHz | 40 | 23 W | 240 | 2.6m | -125.0 | 0.47° | -8.0 dB | 1.60 Gbps | 1.60 | 1.00 | 1.00 | 2.16 |
| LF1-Coverage2 | 1 | 2000 MHz | 40 | 45 W | 120 | 2.6m | -125.0 | 0.47° | -8.0 dB | 1.44 Gbps | 1.44 | 1.00 | 1.00 | 2.16 |
| LF1-Power | 1 | 2000 MHz | 40 | 27 W | 120 | 4.1m | -125.0 | 0.32° | -8.0 dB | 1.60 Gbps | 1.60 | 0.59 | 1.00 | 1.00 |
| LF1-Capacity | 1 | 2000 MHz | 40 | 45 W | 120 | 4.1m | -122.7 | 0.32° | -8.0 dB | 1.96 Gbps | 1.96 | 1.00 | 1.00 | 1.00 |
| LF1-BW1 | 1 | 1000 MHz | 20 | 45 W | 120 | 4.1m | -121.7 | 0.32° | -8.0 dB | 1.24 Gbps | 1.24 | 1.00 | 0.50 | 1.00 |
| LF1-BW2 | 1 | 1000 MHz | 20 | 23 W | 120 | 4.1m | -122.0 | 0.32° | -8.0 dB | 1.05 Gbps | 1.05 | 0.50 | 0.50 | 1.00 |
| LF1-BW3 | 1 | 1000 MHz | 20 | 45 W | 120 | 2.8m | -125.0 | 0.47° | -8.0 dB | 1.04 Gbps | 1.04 | 1.00 | 0.50 | 2.16 |
| LF1-BW4 | 1 | 1000 MHz | 20 | 23 W | 60 | 2.8m | -123.0 | 0.47° | -8.0 dB | 0.80 Gbps | 0.80 | 0.50 | 0.50 | 2.16 |
| LF2-Coverage | 2 | 1000 MHz | 20 | 90 W | 60 | 2.8m | -122.0 | 0.42° | -6.1 dB | 1.18 Gbps | 1.18 | 1.00 | 1.00 | 1.69 |
| LF2-Power | 2 | 1000 MHz | 20 | 68 W | 60 | 3.6m | -120.8 | 0.32° | -6.1 dB | 1.28 Gbps | 1.28 | 0.76 | 1.00 | 1.00 |
| LF2-Capacity | 2 | 1000 MHz | 20 | 90 W | 60 | 3.6m | -119.0 | 0.32° | -6.1 dB | 1.40 Gbps | 1.40 | 1.00 | 1.00 | 1.00 |
| LF2-BW1 | 2 | 500 MHz | 10 | 54 W | 60 | 3.6m | -119.0 | 0.32° | -6.1 dB | 0.77 Gbps | 0.77 | 0.60 | 0.50 | 1.00 |
| LF2-BW2 | 2 | 500 MHz | 10 | 68 W | 60 | 3.6m | -118.0 | 0.32° | -6.1 dB | 0.82 Gbps | 0.82 | 0.76 | 0.50 | 1.00 |

FIG. 24

CAPACITY MAXIMIZATION FOR A UNICAST SPOT BEAM SATELLITE SYSTEM

CROSS-REFERENCES TO RELATED APPLICATIONS

This application is a continuation of, and claims priority to, U.S. patent application Ser. No. 12/176,629, entitled "Capacity Maximization For A Unicast Spot Beam Satellite System," filed Jul. 21, 2008, which claims the benefit of priority to U.S. Provisional Application No. 60/951,178, entitled "Capacity Maximization for a Unicast Spot Beam Satellite System," filed Jul. 20, 2007, the entire contents of both of which are hereby incorporated by reference for all purposes.

BACKGROUND OF THE INVENTION

The present invention relates to satellite communications systems, and more particularly to radio frequency communications between a gateway and a plurality of subscriber terminals via a satellite.

The vast majority of subscribers in urban or suburban areas are served by either hybrid fiber coaxial, cable, or ADSL networks. Both cable and ADSL rely on physical wires to provide network access. The capital expenditure depends on the geographic distance between subscribers and access nodes. The infrastructure cost is shared by all subscribers residing in the area. When the subscriber density is low such as in the rural or remote areas, the wired infrastructures are too costly to be deployed. An alternative solution is providing services via satellite.

The satellite is conceptually similar to a base station in a cellular communications network, where the base station is located at a very high altitude above the earth. A geostationary (GEO) satellite is in orbit about 36,000 km above the equator, and its revolution around the earth is synchronized with the earth's rotation. Therefore, the GEO satellite appears stationary, i.e., fixed on the earth's surface.

Like a cellular infrastructure, a satellite network can divide the covered geography (footprint) into many smaller footprints using multi-beam antennas. A gateway in the footprint of one spot beam can communicate with subscriber terminals in the footprint of other spot beams. The term spot beam refers to a directional radiation pattern provided by a satellite antenna in which the area of the geographical coverage is constrained to a footprint having a direct line of sight to the satellite. The spot beams can carry two-way communications, sent in packets at specific time intervals and allotted frequencies. And all wireless technologies for cellular communications such as CDMA, FDMA and TDMA technologies and the combination thereof can also be applied to the satellite communication. Similar to cellular communication networks that employ frequency reuse to maximize bandwidth efficiency, a satellite communication system has the additional advantage of employing orthogonal polarization to increase the bandwidth.

A satellite communications system has many parameters to work with: (1) number of orthogonal time or frequency slots (defined as color patterns hereinafter); (2) beam spacing (characterized by the beam roll-off at the crossover point); (3) frequency re-use patterns (the re-use patterns can be regular in structures, where a uniformly distributed capacity is required); and (4) number of beams (a satellite with more beams will provide more system flexibility and better bandwidth efficiency, but requires more transponders and amplifiers that are in general traveling-wave tubes amplifiers (TW-TAs). TWTAs are expensive and consume power that must be supplied on-board the satellite.

The prior art satellite communications systems take the approach of maximizing a symbol energy-to-noise-plus-interference (SINR) to the worst-case location within a beam. This approach leads to an increased cost in subscriber terminals (STs) because the receiver at the STs will be over-designed to cope with the worst-case condition. Another approach is to divide the available bandwidth into multiple small frequency ranges (different color patterns) and space them apart to reduce interference. This approach will reduce the available frequency bandwidth for each spot beam and require a large amount of TWTs and TWTAs, therefore require a large power supply on-board the satellite.

Design approaches of prior satellite systems typically do not take into account the effects that various system parameters have on the data-carrying capacity of spot beams. Indeed, choices made in the selection of particular system parameters may significantly reduce capacity performance, especially in an interference-dominated environment. Thus, there is a need for techniques that allow system parameter adjustments to be found that will improve data-carrying capacity.

BRIEF SUMMARY OF THE INVENTION

The present invention relates to a method, system, and apparatus for improved satellite communications. In one embodiment of the invention, a satellite communications system for illuminating a geographic area with signals comprises at least one gateway, a satellite in orbit configured to communicate with the at least one gateway and provide a plurality of service beams to illuminate a plurality of regions in the geographic area, and a plurality of subscriber terminals located in the plurality of regions. The spot beams may include a first spot beam and a second spot beam. The first spot beam may illuminate a first region within the geographic area, in order to send information to a first plurality of subscriber terminals. The second spot beam may illuminate a second region within the geographic area and adjacent to the first region, in order to send information to a second plurality of subscriber terminals. The first and second regions may overlap.

The first spot beam as sent to at least one of the first plurality of subscriber terminals may be affected by interference from other signal sources, including the second spot beam, at a signal-to-interference ratio C/I. The first spot beam as sent to the at least one of the first plurality of subscriber terminals may be further affected by noise at a signal-to-noise ratio C/N. Reception of signals from the first spot beam by the at least one of the first plurality of subscriber terminals may be interference-dominated such that C/I is less than C/N.

Furthermore, the satellite may be operated to maximize data-carrying capacity of the plurality of spot beams as measured in bits/Hz, by utilizing a beam pattern having a specific number of color(s) of frequency and polarization and specific beam spacing that results in higher data-carrying capacity of the plurality of spot beams than achieved with other alternative numbers of color(s) of frequency and polarization and beam spacings.

According to an embodiment of the invention, the plurality of spot beams does not comprise adaptive coding and modulation (ACM) signals, and the data-carrying capacity of the plurality of spot beams is maximized by maximizing minimum data-carrying capacity within the plurality of spot beams.

According to an alternative embodiment of the invention, the plurality of spot beams comprise adaptive coding and modulation (ACM) signals, and the data-carrying capacity of the plurality of spot beams is maximized by maximizing average data-carrying capacity within the plurality of spot beams.

In one specific embodiment, the beam pattern has a single color of frequency and polarization, the beam pattern has a beam spacing characterized by a cross-over point of less than −6 dB, and the beam pattern has a regular frequency re-use pattern.

According to an embodiment of the invention, the first spot beam includes at least a first portion sent to a first subscriber terminal from the first plurality of subscriber terminals utilizing a first coding and modulation combination, and the first spot beam further includes a second portion sent to a second subscriber terminal in the first plurality of subscriber terminals utilizing a second coding and modulation combination, the first coding and modulation combination being different from the second coding and modulation combination. In one specific embodiment, the first coding and modulation combination and second coding and modulation combination are selected according to an adaptive coding and modulation (ACM) scheme.

The following detailed description together with the accompanying drawings will provide a better understanding of the nature and advantages of the present invention.

BRIEF SUMMARY OF THE DRAWINGS

FIG. 2B shows an exemplary modcode table according to one embodiment of the present invention. FIG. 2C shows an exemplary Address-SNR table according to one embodiment of the present invention.

FIG. 24 provides a summary of different systems having different number of colors, bandwidth per beam, number of employed gateways, TWT power per beam, number of TWTs per satellite, the payload aperture, maximum PFD per pole, beam spacing, crossover points, achieved beam capacity, and relative comparison to a four-color baseline system.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing a preferred exemplary embodiment. It is understood that various changes may be made in the function and arrangement of elements without departing from the spirit and scope as set forth in the appended claims.

Satellite Communication System

Figure 1:
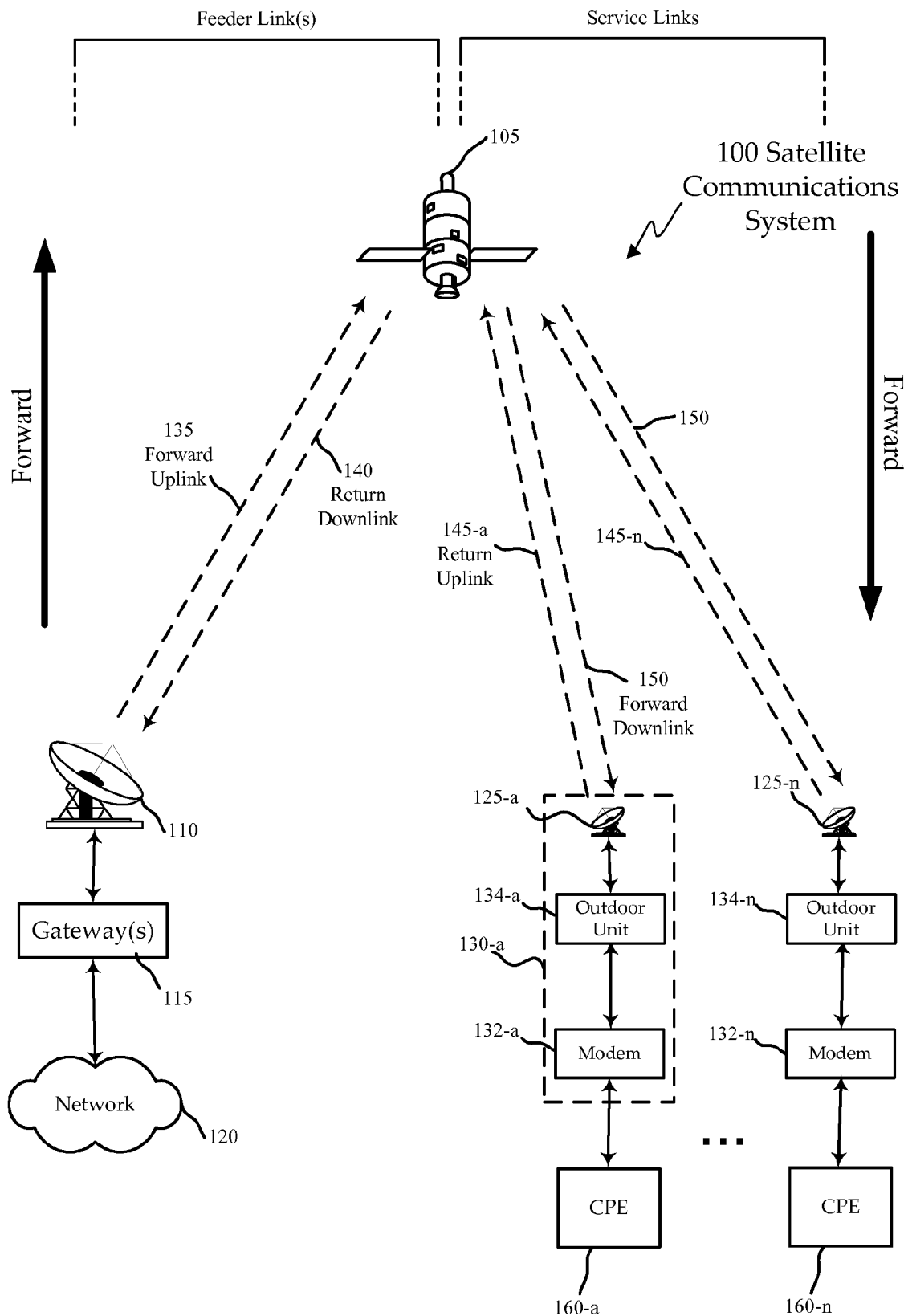
FIG. 1 shows a block diagram of an exemplary satellite communications system according to one embodiment of the present invention.

Referring first to FIG. 1, a block diagram of an exemplary satellite communications system 100 configured according to various embodiments of the invention is shown. The satellite communications system 100 includes a network 120, such as the Internet, interfaced with one or more gateways 115 that is configured to communicate with one or more subscriber terminals 130, via a satellite 105.

The gateway 115 is sometimes referred to as a hub or ground station and services the feeder links 135, 140 to and from the satellite 105. Although only one gateway 115 is shown, this embodiment has a number of gateways all coupled to the network 120, for example, twenty or forty gateways. The gateway 115 schedules traffic to the subscriber terminals 130, although other embodiments could perform scheduling in other parts of the satellite communication system 100.

Subscriber or user terminals 130 include an outdoor unit (ODU) 134, a satellite modem 132 and an antenna 125. Although the satellite communications system 100 is illustrated as a geostationary satellite based communication system, it should be noted that various embodiments described herein are not limited to use in geostationary satellite based systems, for example some embodiments could be low earth orbit (LEO) satellite based systems. Some embodiments could have one satellite 105, while others could have more satellites working together in concert.

A satellite communications system 100 applicable to various embodiments of the invention is broadly set forth herein. In this embodiment, there is a predetermined amount of frequency spectrum available for transmission. The feeder links may use the same or overlapping frequencies with the service links or could use different frequencies. The gateways 115 could be placed outside the service beams when frequencies are reused.

The network 120 may be any type of network and can include, for example, the Internet, an IP network, an intranet, a wide-area network (WAN), a local-area network (LAN), a virtual private network (VPN), a virtual LAN (VLAN), a fiber optical network, a hybrid fiber-coax network, a cable network, the Public Switched Telephone Network (PSTN), the Public Switched Data Network (PSDN), a public land mobile network, and/or any other type of network supporting data communication between devices described herein, in different embodiments. The network 120 may include both wired and wireless connections, including optical links As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals 130) directed to a destination connected with the network 120, and can format the received signals for transmission with the network 120. The gateway 115 may use a broadcast signal, with a modulation and coding ("modcode") format adapted for each packet to the link conditions of the terminal 130 or set of terminals 130 to which the packet is directed (e.g., to account for the variable service link 150 conditions from the satellite 105 to each respective terminal 130).

A device (not shown) connected to the network 120 may communicate with one or more subscriber terminals 130 and through the gateway 115. Data and information, for example Internet protocol (IP) datagrams, may be sent from the device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 that is developed in 2003 and ratified by ETSI (EN 302 307), DOCSIS (Data Over Cable Service Interface Specification developed by Cable Labs) and WiMAX (The Worldwide interoperability for Microwave Access based on the IEEE802.16) standards. The link 135 from the gateway 115 to the satellite 105 is referred to hereinafter as the downstream uplink 135.

The gateway 115 may use an antenna 110 to transmit the downstream uplink signal to the satellite 105. In one embodiment, the antenna 110 comprises a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, and low noise.

In one embodiment of the present invention, a geostationary satellite 105 is configured to receive the signals from the location of antenna 110 and within the frequency band and specific polarization transmitted. The satellite 105 may, for example, use a reflector antenna, lens antenna, phased array antenna, active antenna, or other mechanism known in the art for reception of such signals. The signals received from the gateway 115 are amplified with a low-noise amplifier (LNA) and then frequency converted to a transmit frequency. The satellite 105 may process the signals received from the gateway 115 and forward the signal from the gateway 115 to one or more subscriber terminals 130. In one embodiment of the present invention, the frequency-converted signals are passed through a demultiplexer that separate the various received signals into their respective frequency bands. The separate signals are amplified by TWTAs, one for each frequency band and are combined in a multiplexer to form the high-power transmission signals. The high-power transmission signal passed through a transmit reflector antenna (e.g., a phased array antenna) that forms the transmission radiation pattern (spot beam). In one embodiment of the present invention, the satellite 105 may operate in a multi-beam mode, transmitting a number of narrow beams each directed at a different region of the earth, allowing for segregating subscriber terminals 130 into the various narrow beams. With such a multibeam satellite 105, there may be any number of different signal switching configurations on the satellite 105, allowing signals from a single gateway 115 to be switched between different spot beams.

In another embodiment of the present invention, the satellite 105 may be configured as a "bent pipe" satellite, wherein the satellite 105 may frequency and polarization convert the received carrier signals before retransmitting these signals to their destination, but otherwise perform little or no other processing on the contents of the signals. A spot beam may use a single carrier, i.e., one frequency or a contiguous frequency range per beam. A variety of physical layer transmission modulation and coding techniques may be used by the satellite 105 in accordance with certain embodiments of the invention. Adaptive coding and modulation can be used in some embodiments of the present invention.

For other embodiments of the present invention, a number of network architectures consisting of space and ground segments may be used, in which the space segment is one or more satellites while the ground segment comprises of subscriber terminals, gateways, network operations centers (NOCs) and a satellite management center (SMC). The satellites can be GEO or LEO satellites. The gateways and the satellites can be connected via a mesh network or a star network, as evident to those skilled in the art.

The service link signals are transmitted from the satellite 105 to one or more subscriber terminals 130 and received with the respective subscriber antenna 125. In one embodiment, the antenna 125 and terminal 130 together comprise a very small aperture terminal (VSAT), with the antenna 125 measuring approximately 0.6 meter in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to various consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), and/or any number of hybrid or other schemes known in the art.

A subscriber terminal, for example 130-*a*, may transmit data and information to a destination on the network 120 via the satellite 105. The subscriber terminal 130 transmits the signals via the upstream uplink 145-*a* to the satellite 105 using the antenna 125-*a*. A subscriber terminal 130 may transmit the signals according to a variety of physical layer transmission modulation and coding techniques. In various embodiments of the present invention, the physical layer techniques may be the same for each of the links 135, 140, 145, 150, or may be different. The link from the satellite 105 to the gateway 115 may be referred to hereinafter as the upstream downlink 140.

Figure 2A:
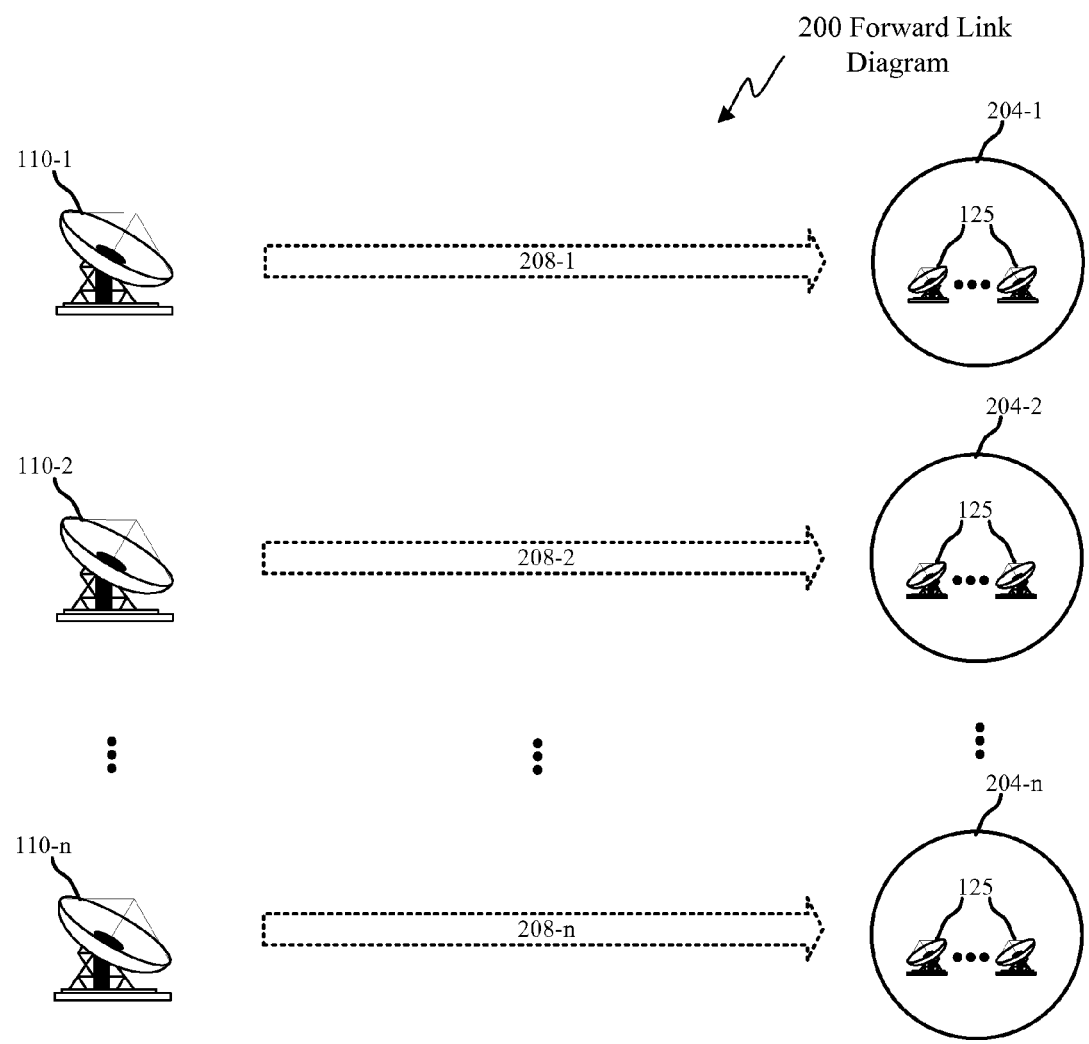
FIG. 2A shows a diagram of forward links according to one embodiment of the present invention.

Referring next to FIG. 2A, a diagram of an embodiment of a forward link diagram 200 is shown. A number of gateway antennas 110 respectively have a forward channel 208 through the satellite 105 to a spot beam 204. A number of subscriber terminal (ST) antennas 125 are configured in the spot beam 204 to capture the forward channel 208. The ST 130 are distributed among the n spot beams 204 based generally upon their presence within a particular spot beam 204. There are places where the spot beams 204 overlap such that a particular subscriber terminal 130 could be allocated to one or another spot beam 204.

The upstream feeder link 140 is separated from the downstream service link 150 using some sort of orthogonality, for example, temporal, spatial, frequency, and/or polarization. In one embodiment, the upstream feeder link 140 has a feeder spot beam that is geographically separated from the service spot beams, but any type of orthogonality could accomplish the separation.

Referring to FIG. 2B, an example of a modulation and coding (modcode) table 202 is illustrated in the form of a block diagram. This form of modcode table 202 may, for example, be used by a gateway 115 to determine the modcode to be used for packets destined for a subscriber terminal operating in a given signal quality range. The table contains a column listing a number of modcode formats 205. Each modcode format 205 corresponds to a specified signal quality range 210. The signal quality range may provide some knowledge on the channel for an associated region. For example, the signal quality range 210 can be defined as the signal-to-interference-plus-noise (SINR) ratio that may be measured at the subscriber terminals for a predetermined bit error rates (BER) and/or packet error rates (PER) and reported back to the gateway. BER and/or PER can be extracted from a cyclic redundant check (CRC) calculation with the gateway transmits data packets or data frames containing a certain length of bits whose pattern are known a prior by the subscriber terminal. Thus, using the signal quality attributed to a destination link for a packet, a signal quality range 210 encompassing the link may be identified, and the appropriate modcode may be selected. For example, if a destination link has a signal quality within Range 7, the modcode QPSK 3/4 may be used. In some embodiments of the present invention, one or more of the ranges may include a reliability margin (which may be beneficial when channel conditions are changing rapidly, for example). One or more of the ranges may be modified dynamically to adjust this reliability margin as well.

In other embodiments of the present invention, other signal quality indicators may be used, such as a measured signal to noise ratio, an estimated signal to noise ratio, a bit error rate, a received power level, or any other communication link quality indicator. It is also worth noting that a number of other data structures may also be used to relate signal quality ranges to modcodes. In one embodiment, each signal quality is associated with a different packet forwarding queue. In still other embodiments, other information density parameters in addition to modcode changes may be added to further adapt a signal to environmental or other conditions.

Adaptive Code Modulation (ACM)

Turning to FIG. 2C, an example of an address/SNR table 250 is illustrated in the form of a block diagram. This form of address/SNR table 250 may, for example, be used by a gateway 115 to lookup the signal quality 260 of a subscriber terminal 130 to which a packet is destined, based on the destination address 255. The tables in FIGS. 2B and 2C may be embodied on one or more memories, which may be either on or off chip, and may be used in conjunction with one another to correlate a MAC address with a particular modcode format.

Although a destination MAC address is used in this example, other mechanisms may be used to identify particular subscriber terminals, including destination VLAN-ID, a Destination Internet Protocol (DIP) address, a private addressing ID, any other set of data comprising or otherwise correlated with a destination address. The data address may be parsed from a received data packet after arrival at a device, or it may be received in any other manner known in the art. It is also worth noting that a number of other data structures may also be used to relate an address to signal quality.

Once a modcode for a particular packet or packets is identified, for example using the modcode table 202, it may then be encapsulated, coded, mapped and transmitted in a variety of ways, as known in the art. One way to implement an adaptive coding and modulation (ACM) is via the DVB-S2 standard, which specifically provides for its use. As noted above, ACM may change the modulation format and Forward Error Correction (FEC) codes (modcodes) to best match the current link conditions. This adaptation may occur on a frame by frame basis. The discussion that follows assumes an IP based packet network in the context of a DVB-S2 satellite transmission system, but the concepts may be applied for a variety of systems, including systems implementing DOCSIS, WiMAX, or any wireless local loops (WLLs).

Figure 3:
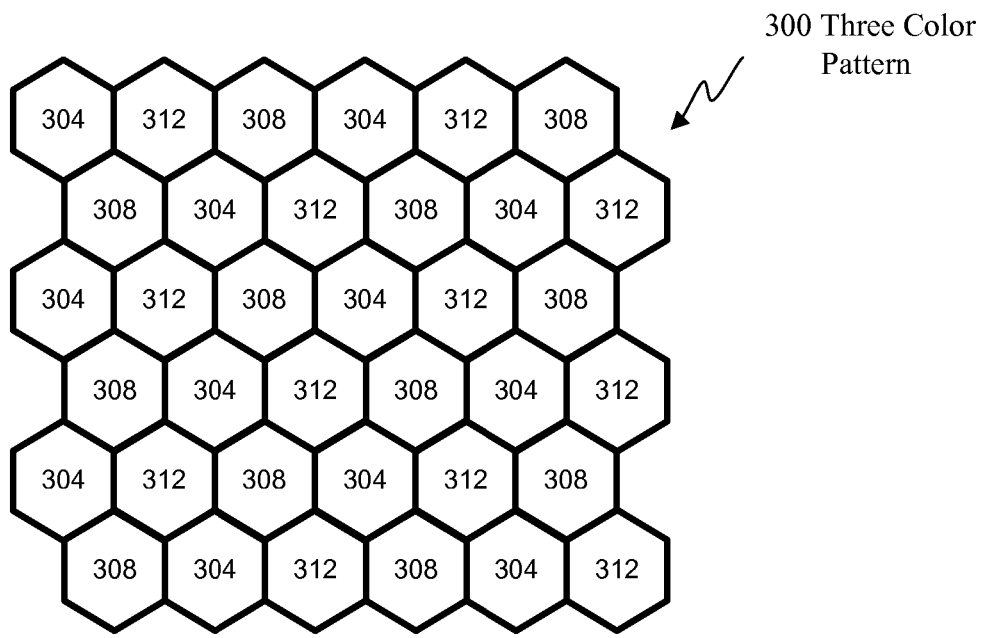
FIG. 3 shows a diagram of a prior art three-color spot beam pattern.

With reference to FIG. 3, a diagram of a prior art three color spot beam pattern 300 is shown. These spot beams 304, 308, 312 could correspond to three different frequency groups, with one group for each color. Patterns with even more colors are also known. The pattern assures that no directly adjacent spot beams use the same color. Orthogonality is achieved by the use of the different colors. For example, the first color could correspond to 2.0 through 2.1 GHz, the second color could correspond to 2.1 through 2.2 GHz and the third color could correspond to 2.2 through 2.3 GHz. The spot beams are shown as hexagon shaped, but are more circular or oval in shape such that there is overlap between the spot beams 304, 308, 312.

Figure 4:
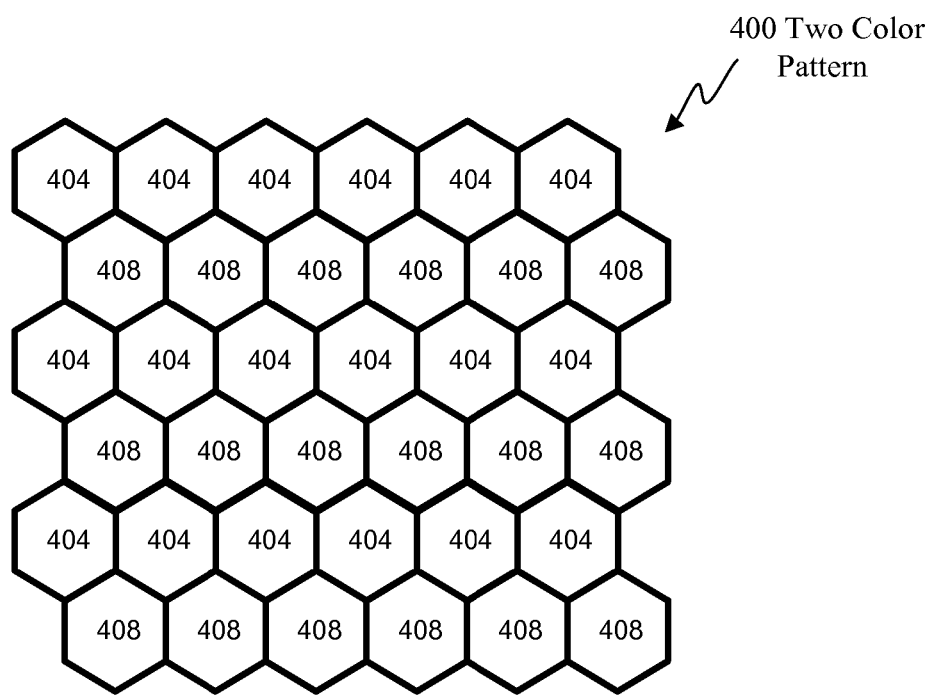
FIG. 4 shows a diagram of a two-color spot beam pattern in accordance with one embodiment of the present invention.

Referring next to FIG. 4, a diagram of an embodiment of the present invention having a two-color spot beam pattern 400 is shown. With only two colors available, spot beams 404, 408 will overlap. Here we have a row of spot beams 404 in a first color and a row of spot beams 408 in a second color. For example, the first color could be 2.0 through 2.15 GHz and the second color could be 2.15 through 2.3 GHz. Along the rows, there will be some confusion between directly adjacent spot beams that have the same color. By going from three to two colors, the available frequency bandwidth for each spot beam 404, 408 increases by fifty percent.

Figure 5:
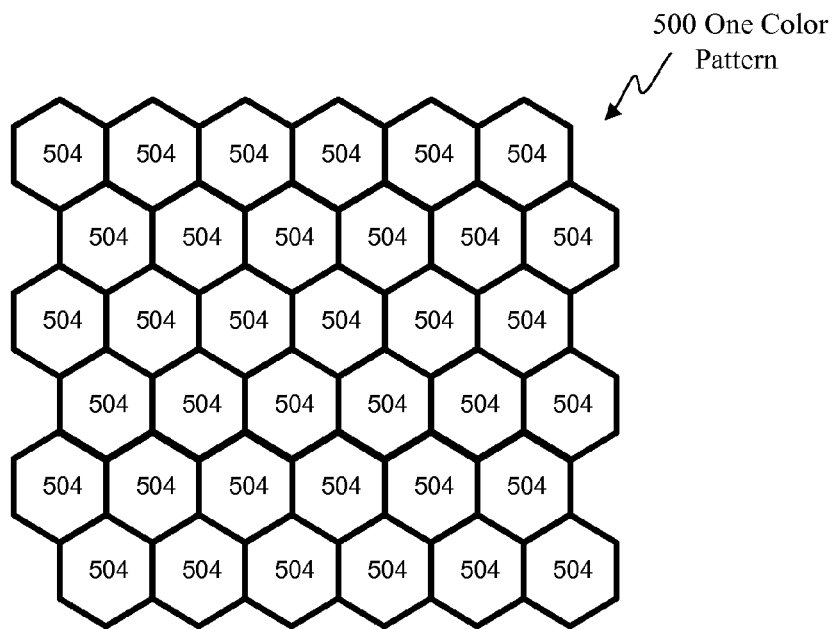
FIG. 5 shows a diagram of a one-color spot beam pattern in accordance with one embodiment of the present invention.

With reference to FIG. 5, a diagram of an embodiment of the present invention having a one-color spot beam pattern 500 is shown. This embodiment uses the same or at least partially overlapping frequencies in each spot beam 504. For example, the spot beams 504 could each use 2.0 through 2.3 GHz. All immediately adjacent spot beams 504 use the same frequency range. Other embodiments of the present invention could have patches or portions of the color pattern that have immediately adjacent spot beams that use the same or overlapping frequency ranges.

Figure 6:
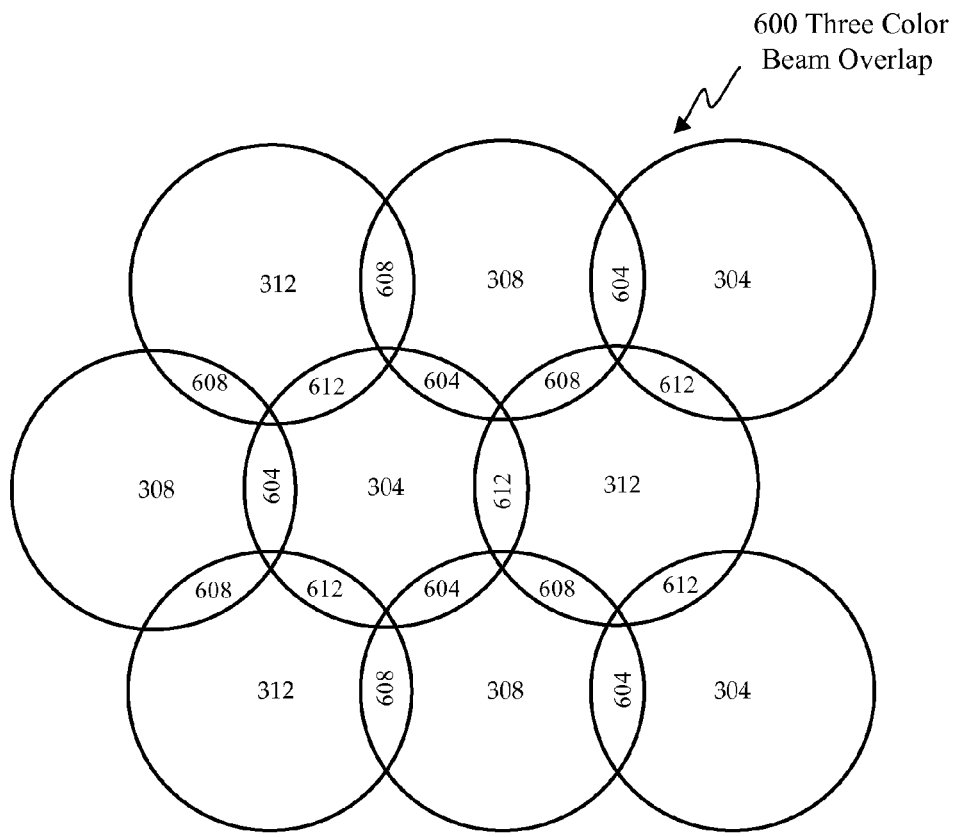
FIG. 6 shows a diagram of a prior art three-color beam overlap pattern.

Referring next to FIG. 6, a diagram of a prior art three color beam overlap pattern 600 is shown. This diagram corresponds to a portion of FIG. 3, but shows the spot beams 304, 308, 312 as circles rather than hexagons. FIG. 6 is also idealized in that the overlap could be of any size as the signal continues outside the circle, but at a lower signal strength such that the diameter of the circles are somewhat arbitrary as the radio signal strength falls off quickly with distance relative to the center. Generally, the STs 130 within the circle can receive information from the spot beam corresponding to that circle.

Overlap occurs in various overlap regions 604, 608, 612. The first type of overlap region 604 corresponds to an area where STs 130 can receive both from a first color beam 304 and a second color beam 308. The second type of overlap region 608 corresponds to an area where STs 130 can receive both from a second color beam 308 and a third color beam 312. The third type of overlap region 612 corresponds to an area where STs 130 can receive both from the first color beam 304 and the third color beam 312. In the overlap regions 604, 608, 612, STs 130 could optionally receive from either spot beam causing the overlap.

Figure 7:
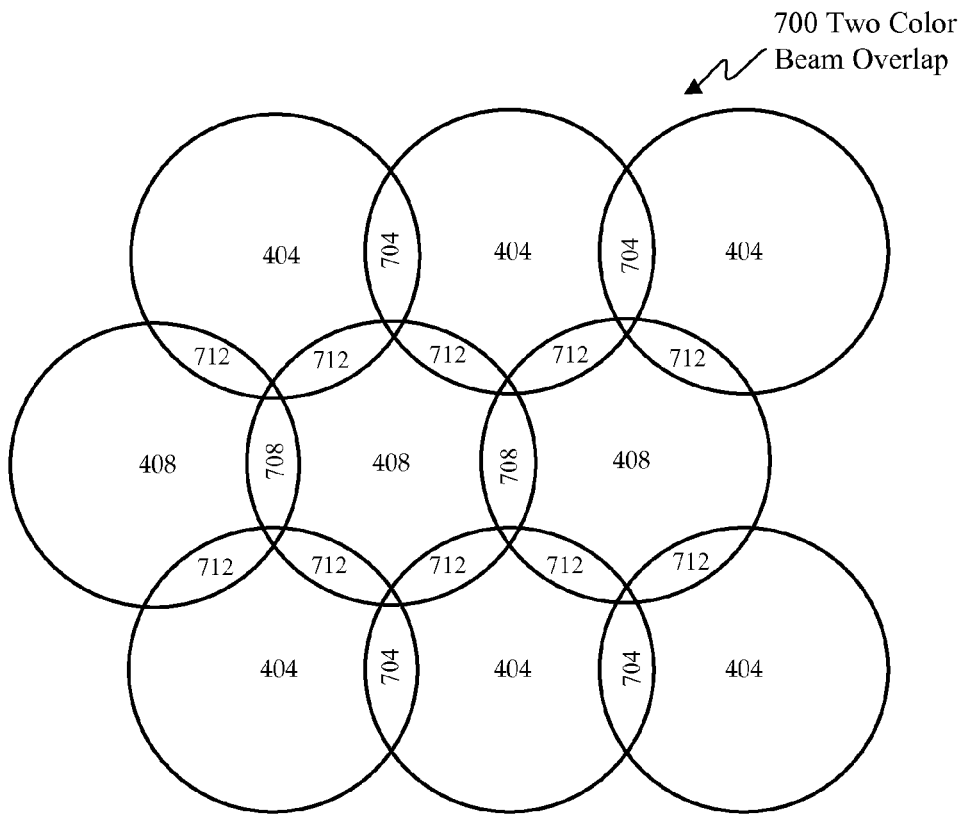
FIG. 7 shows a diagram of a two-color beam overlap pattern in accordance with one embodiment of the present invention.

With reference to FIG. 7, a diagram of an embodiment of the present invention having a two-color beam overlap pattern 700 is shown. There are three different types of overlap regions 704, 708, 712 in this embodiment also. The third overlap region 712 correspond to an area where STs 130 can receive from both a first color beam 404 and a second color beam 408. In the first and second types of overlap regions 704, 708, directly adjacent spot beams use the same or overlapping frequencies such that STs 130 in the overlap regions 704, 708 could become confused because of the interference. This embodiment of the present invention uses adaptive coding and modulation (ACM) to enable reception in the presence of the interference in the overlap regions 704, 708. Effectively, the coding and/or modulation are modified to slow the data rate until an acceptable signal quality is achieved.

Using ACM, the modulation format and Forward Error Correction (FEC) codes (modcodes) for a data frame may be adapted to better match the link conditions for each user in a multi-user system. ACM can be used in both directions. A return channel or other means may be used to report the conditions of a receiving terminal. These link conditions are often characterized by the modem's 132 signal to noise ratio (SNR) or signal-to-interference-plus-noise ratio (SINR) if the modem 132 resides in a color-beam overlap region. In a broadcast system, for example, the data frame broadcasted to a number of users includes data packets designated only for an individual modem or small group of modems. A message transmitted to a user requires fewer symbols and less time when a higher order modulation and higher code rate is used. Lower order modulation and lower code rate are more reliable but require more time to transmit the same size message. Using ACM, each packet may be transmitted at an optimized modulation and coding (modcode) level given the destination terminal's link conditions.

Figure 8:
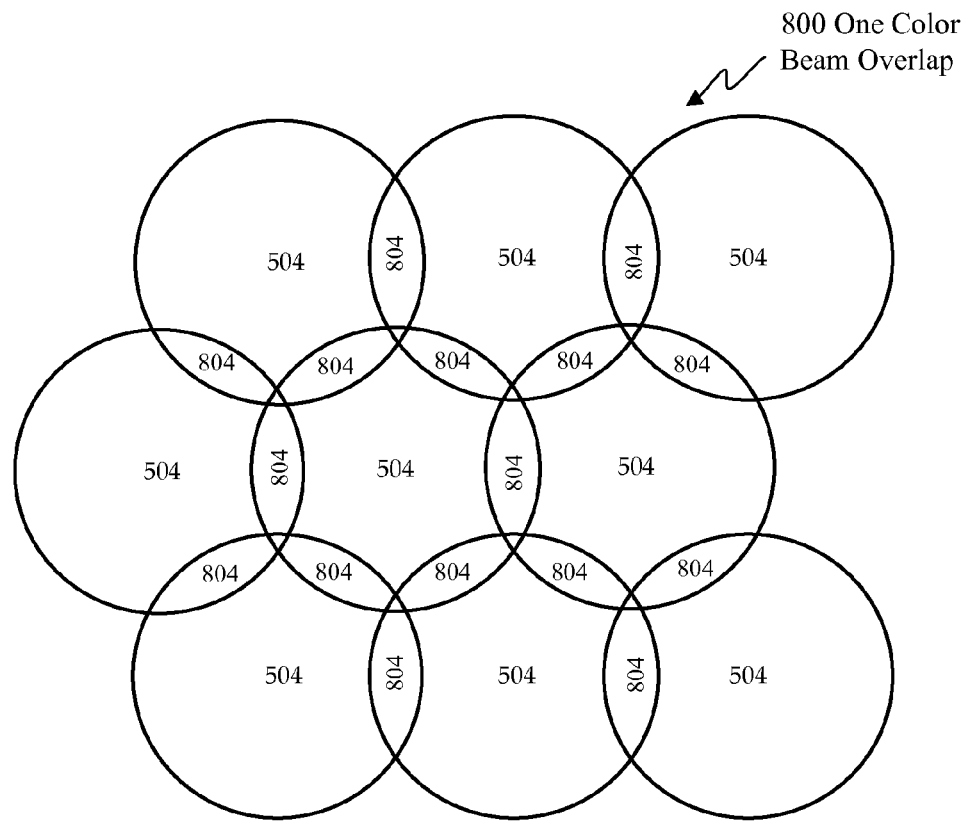
FIG. 8 shows a diagram of a single-color beam overlap pattern in accordance with one embodiment of the present invention.

With reference to FIG. 8, a diagram of an embodiment of the present invention of a single color beam overlap pattern 800 is shown. Here, all beams use the same or overlapping frequencies in this embodiment. The overlap regions 804 receive interference from adjacent beams as frequencies used are common among beams. Once again, ACM is used to mitigate the effect of interference. STs 130 proximate to the overlap regions may see signals from two or more beams 504. The ST 130 may sample the signal from each beam 504 and use the one that provides the most reliable signal reception. In this way, the system 100 can assign STs 130 among the beams.

Figure 9A:
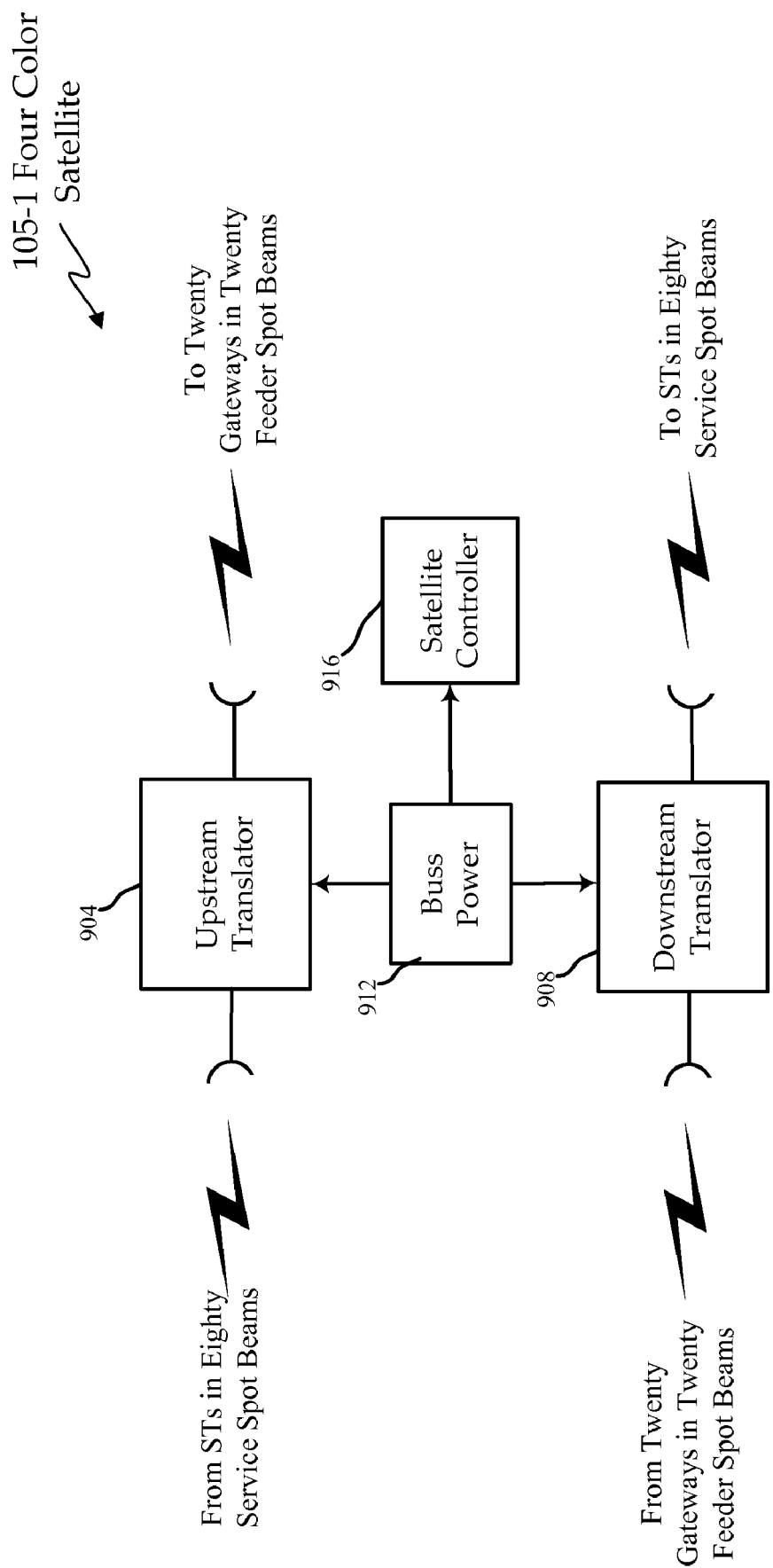
FIG. 9A shows a block diagram of a prior-art satellite having a four-color beam pattern for the service link.

Referring next to FIG. 9A, a block diagram of a prior art satellite 105 is shown in block diagram form. The satellite 105 in this embodiment communicates with twenty gateways 115 and all STs 130 using twenty feeder and eighty service spot beams. Each feeder link spot beam feeds four service link spot beams in this embodiment. Other embodiments could use more or less gateways/spot beams. There are likely to be thousands or millions of STs 130 divided by geography between the service link spot beams 204. Buss power 912 is supplied using a power source such as chemical fuel, nuclear fuel and/or solar energy. A satellite controller 916 is used to maintain attitude and otherwise control the satellite 105. Software updates to the satellite 105 can be uploaded from the gateway 115 and performed by the satellite controller 916.

Information passes in two directions through the satellite 105. A downstream translator 908 receives information from the twenty gateways 115 for relay to subscriber terminals 130 using eighty service spot beams. An upstream translator 904 receives information from the subscriber terminals 130 occupying the eighty spot beam areas and relays that information to the twenty gateways 115. This embodiment of the satellite only translates carrier frequencies in the downstream and upstream links from the spot beams 308, 304 in a "bent-pipe" fashion, i.e., the only processing is frequency translation and retransmission, but other embodiments could do baseband switching between the various forward and return channels. The frequencies and polarization for each spot beam could be programmable or preconfigured.

Figure 9B:
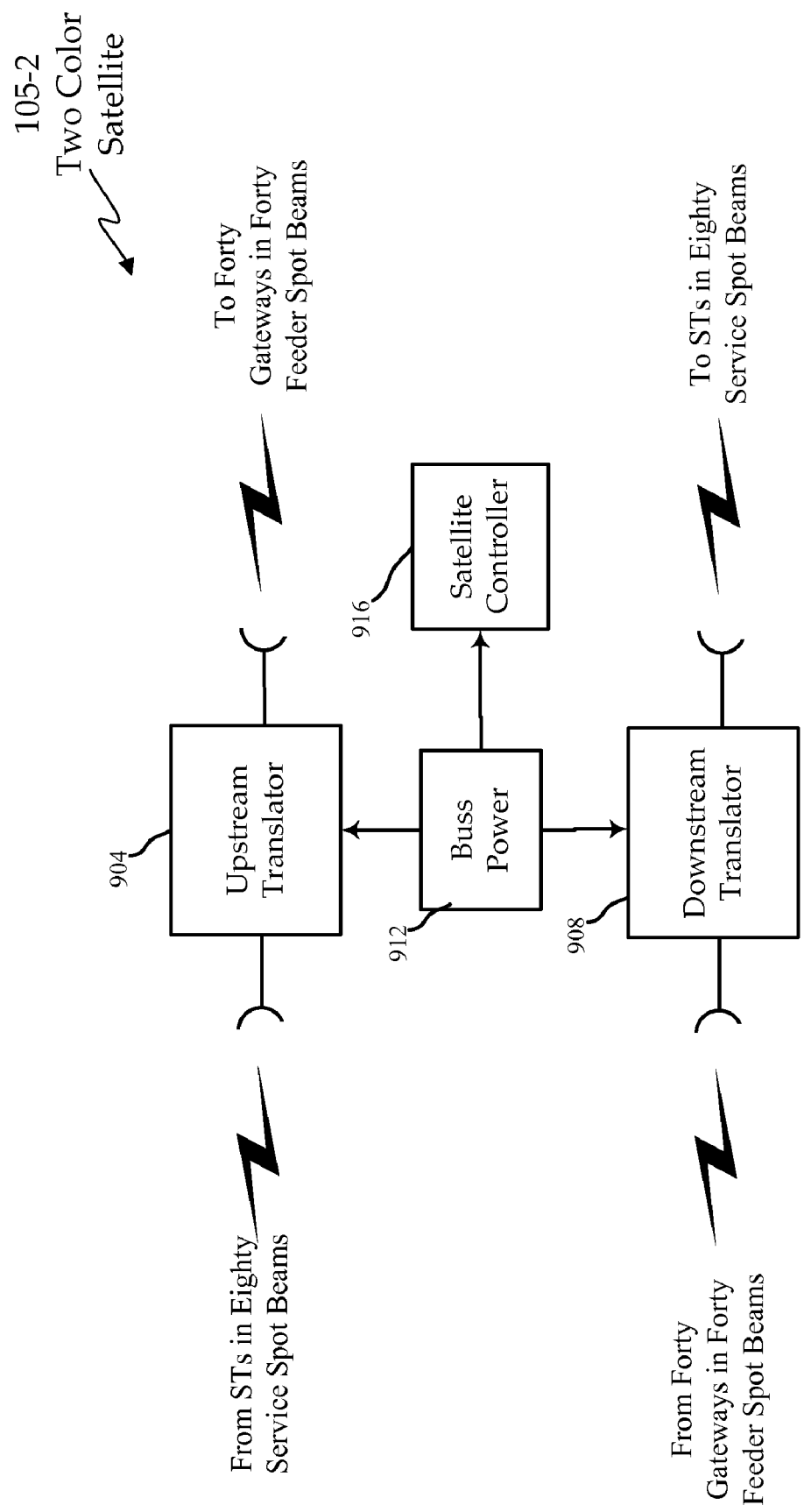
FIG. 9B shows a block diagram of the satellite 105 having a two-color beam pattern for the service link according to one embodiment of the present invention.

With reference to FIG. 9B, a block diagram of satellite 105 according to one embodiment of the present invention is shown. This embodiment uses two colors on the service link spot beams 404, 408. There are eighty service link spot beams 404, 408. The gateways 115 support the service link spot beams with forty gateways 115. With the two colors, each gateway 115 can support two service link spot beams 404, 408.

Figure 9C:
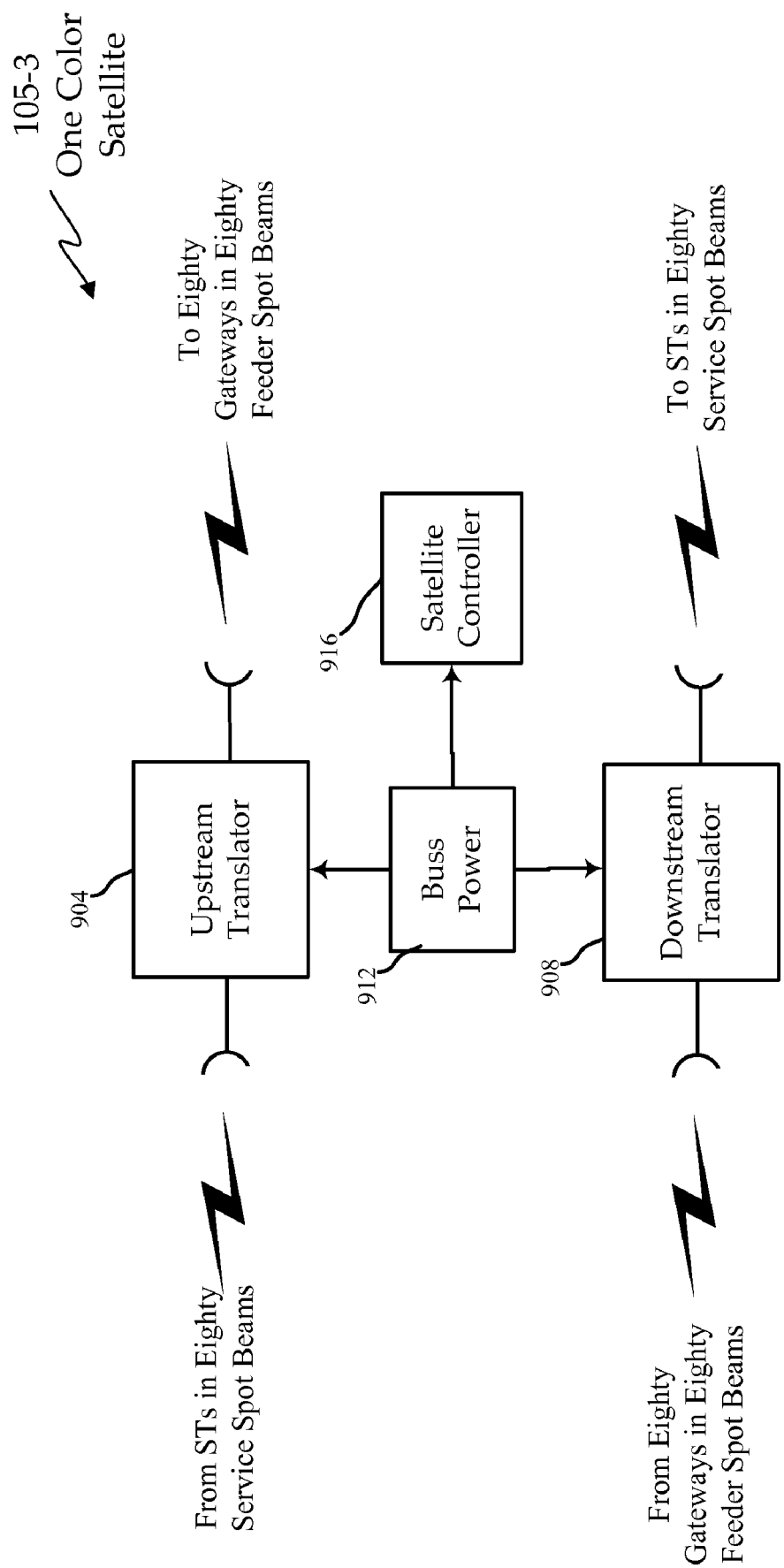
FIG. 9C shows a block diagram of the satellite 105 having a one-color beam pattern according to another embodiment of the present invention.

Referring next to FIG. 9C, a block diagram of satellite 105 according to another embodiment of the present invention is shown. This embodiment uses one color on the service link spot beams 504. There are eighty service link spot beams 504. The gateways 115 support the service link spot beams with eighty gateways 115. With the one color, each gateway 115 can support one service link spot beams 504.

Figure 10:
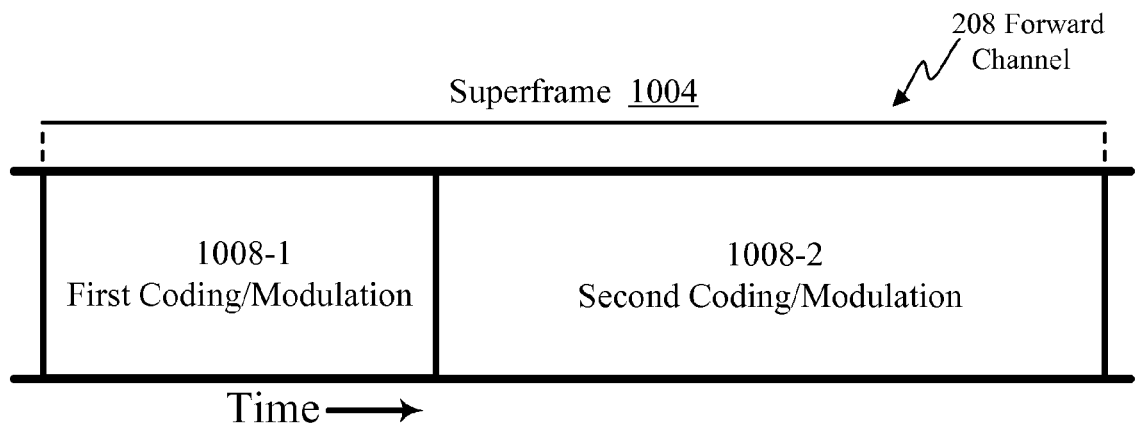
FIG. 10 shows a diagram of a forward channel of FIG. 2 in accordance with one embodiment of the present invention.

With reference to FIG. 10, a diagram of forward channel 208 according to an embodiment of the present invention is shown. In this simplified example, a superframe 1004 is divided between two modcodes 1008. A first modcode 1008-1 is used for the STs 130 largely outside the overlapping regions, and a second modcode is used for the STs 130 inside the overlapping regions. For example, the first modcode 1008-1 could be 32 APSK rate 5/6 and the second modcode could be QPSK rate 1/2. To deliver the same amount of data, the second modcode 1008-2 uses a larger time slice of the superframe 1004. The division of time slices between the two groups is also affected by the number of group members and the bandwidth requirements of the groups.

Other embodiments of the present invention could have more than two modcode schemes that divide the data stream (e.g., three, four, five, eight, twelve, sixteen, etc.). The relative size of the modcode schemes in the superframe 1004 can remain static or change over time in various embodiments. Further, some embodiments of the present invention may not use a superframe structure and change the coding and modulation as needed. STs 130 can be moved between the various modcode 1008 as a function of their bit error rate (BER) or other factors.

Figure 11:
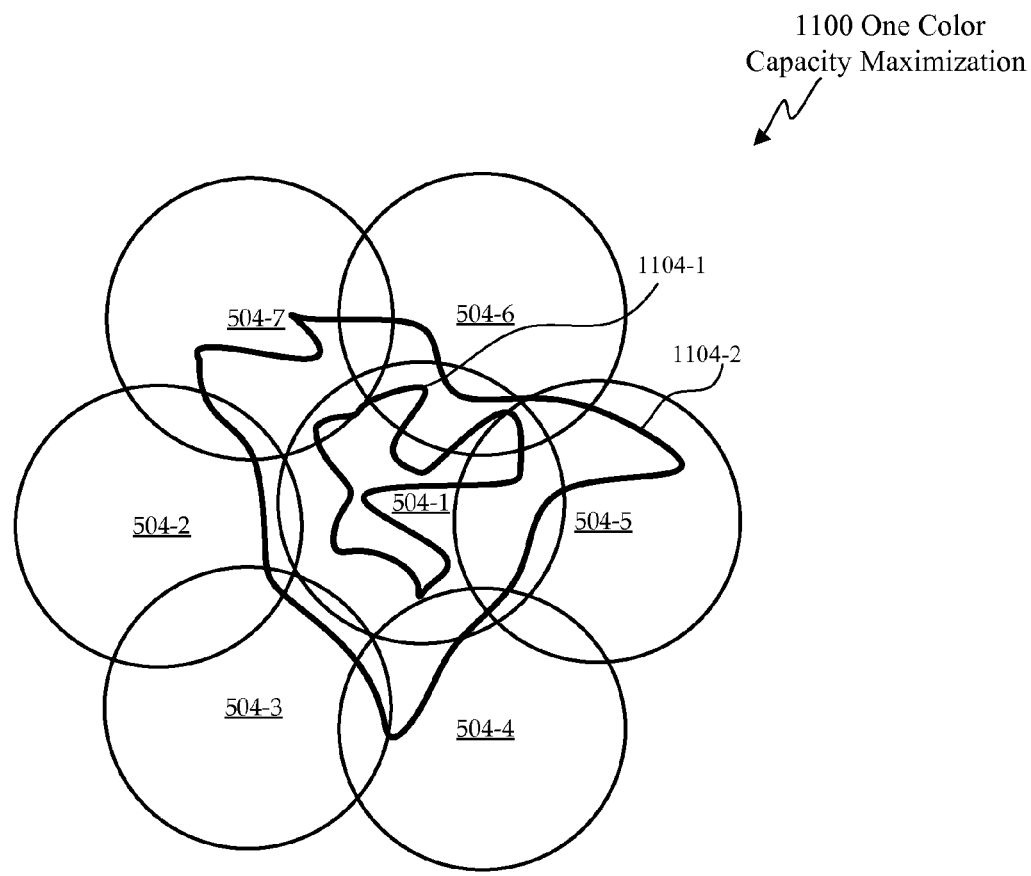
FIG. 11 shows a diagram of a one-color beam pattern that uses non-uniform beam dispersion in accordance with one embodiment of the present invention.

Referring to FIG. 11, a diagram of a one-color beam pattern that uses non-uniform beam dispersion according to one embodiment of the present invention is shown. Population gradients 1104 indicate where the population is most dense relative to other gradients in a topographic manner. In this embodiment, the spot beams 504 can be moved to get more the central region of each spot beam 504 over the population. For example, spot beam 504-1 was moved away from a uniform grid spacing to sit over population 1104-1 more squarely. Other spot beams 504 may also be moved. In some cases, there may be two spot beams that overlap to a substantial degree, for example, at least 80%, 70%, 60%, 50%, 40%, 30%, or 10% overlap.

Figure 12A:
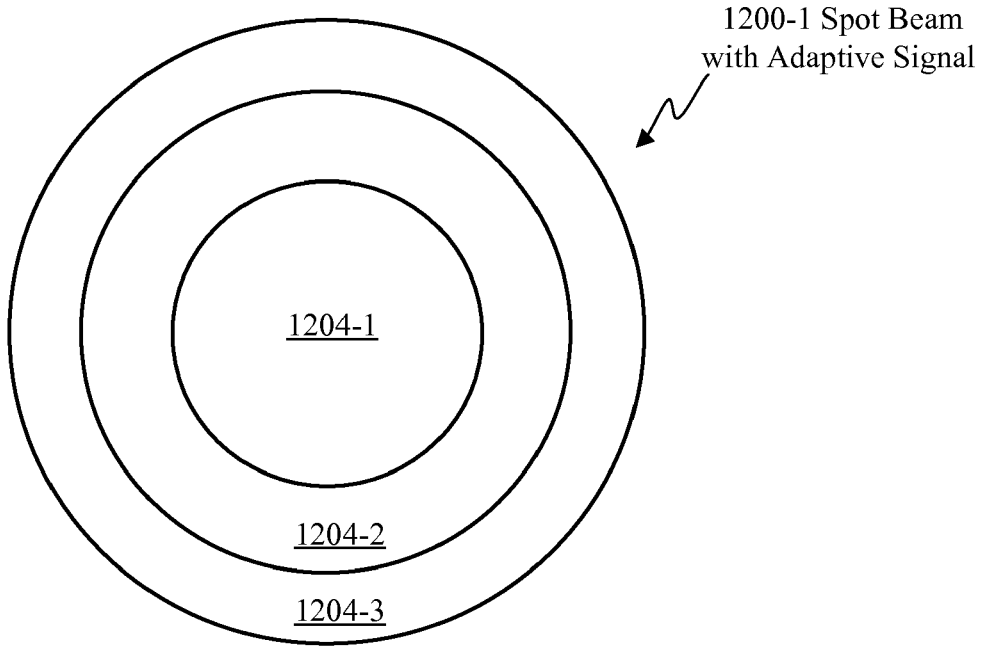
FIG. 12A shows a spot beam that uses ACM in various regions having circular shape of the spot beam in accordance with one embodiment of the present invention.

With reference to FIG. 12A, an embodiment of a spot beam 1200-1 is shown that uses ACM in various regions of the spot beam. Not in strict adherence to the geometric shapes shown in the figure, the subscriber terminals 130 in the spot beam 1200 are divided among several coding and modulation (CM) areas 1204. The various CM areas are shown in an idealized shape, but are not completely geometric as STs 130 may be irregularly distributed according to these general areas. As STs 130 report higher or lower error rates, they can be moved from one CM area to another. For example, a ST 130 may be assigned to a third CM area because of a location adjacent to a neighboring beam causing interference, but the ST 130 may have a very low bit-error rate (BER). The system may temporarily assign the ST 130 to a second CM area with a higher data rate and observe the BER. If the BER is acceptable, the ST 130 will remain in the second CM area until the BER becomes unacceptable.

The first CM area 1204-1 is generally circular and located near the center of the spot beam. A location near the center makes it less likely neighboring beams in a one- or two-color scheme will overlap. The first CM area 1204-1 would have the highest data rate by selecting an appropriate coding and modulation, the second CM area 1204-2 would have a lower data rate and the third CM area 1204-3 would have the lowest data rate. Generally, lower data rates and their corresponding coding and modulation will produce higher link margin or gain. Those areas at the periphery of the spot beam 1200 are more likely to have interference from neighboring spot beams that can be compensated with the higher link margin a lower data rate affords.

Figure 12B:
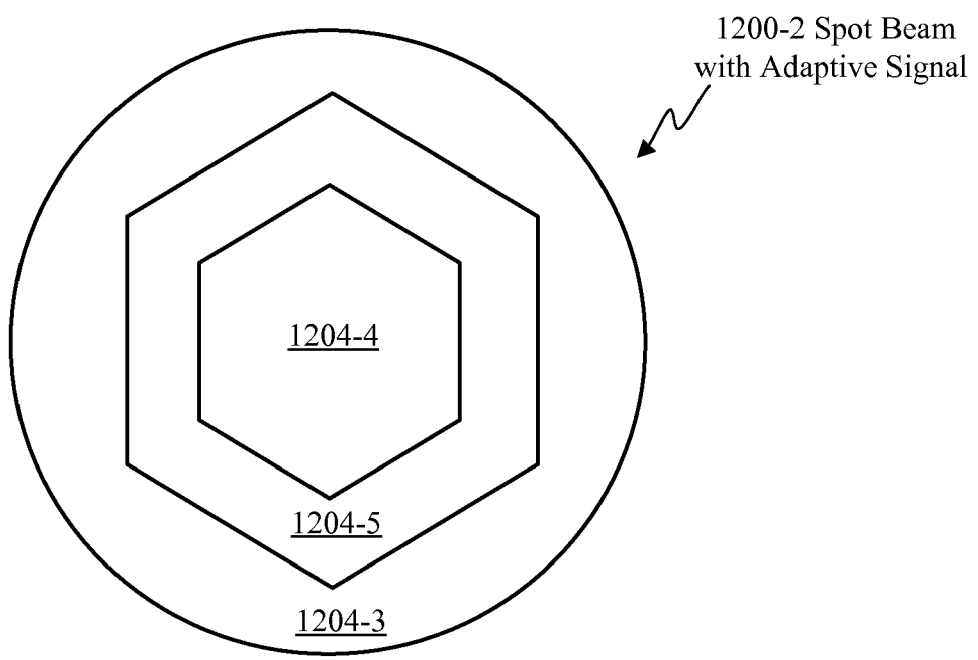
FIGS. 12B and 12C shows a spot beam that use ACM in various regions having respective hexagon shaped and irregular shape of the spot beam in accordance with one embodiment of the present invention.
Figure 12C:
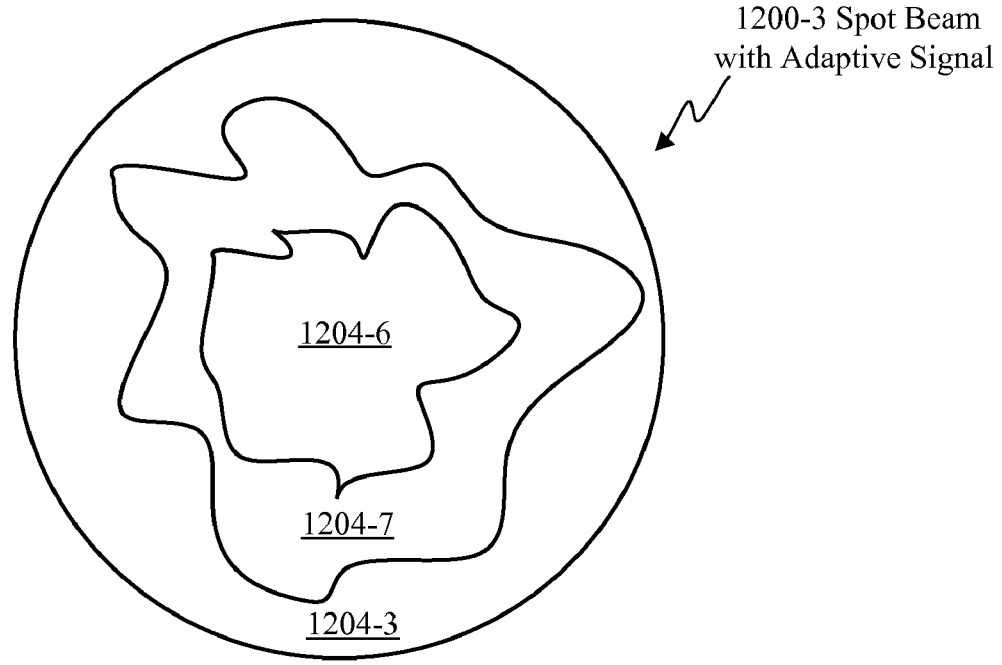

Referring next to FIGS. 12B and 12C, two additional embodiments of a spot beam 1200 are shown that use ACM in various regions of the spot beam 1200. These embodiments demonstrate that other geometries for the CM areas 1204 are possible. The embodiment of FIG. 12B has two hexagon shaped CM areas 1204-4, 1204-5 surrounded by a circular shaped CM area 1204-3. In FIG. 12C, the shape of the interior two CM areas 1204-6, 1204-7 are irregular and may change over time. Obstructions, geography, weather and other factors may change the geometry.

Figure 13:
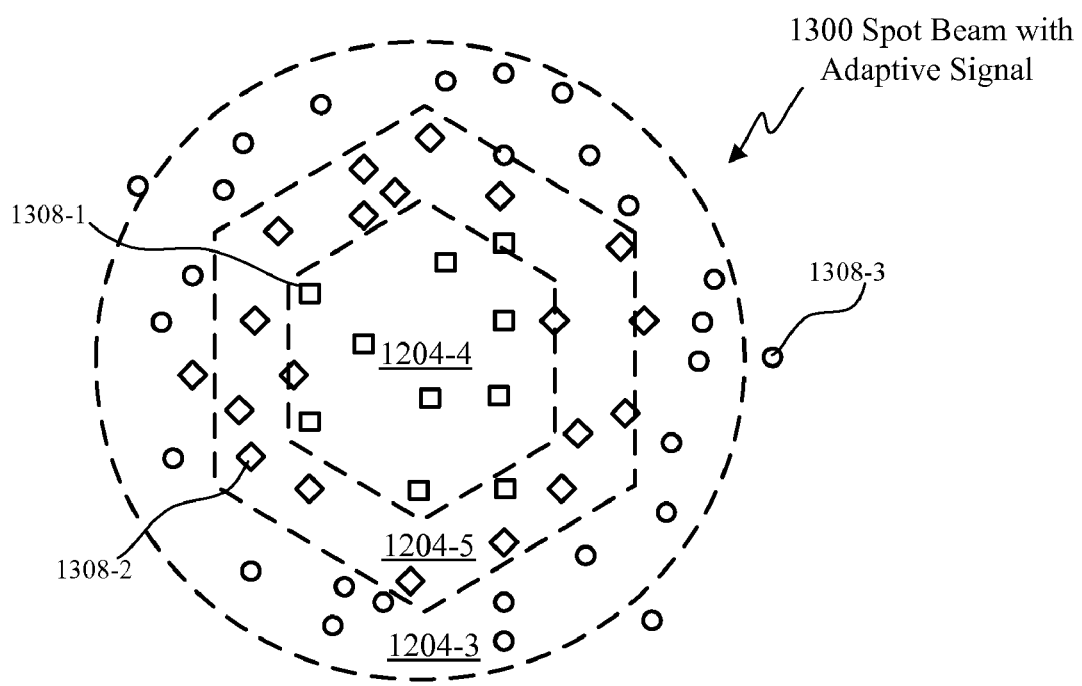
FIG. 13 shows a spot beam having individual subscriber terminals distributed among vaguely defined coding and modulation areas in accordance with one embodiment of the present invention.

With reference to FIG. 13, an embodiment of a spot beam 1300 is shown with individual STs 1308 shown distributed among vaguely defined CM areas 1204. The circular-shaped STs 1308-3 are generally located in an area defined between an outside the larger hexagon CM area 1204-5 and an inside the circular CM area 1204-3, but there are a few STs that do not fall in that area. As particular STs 1308 no longer need a CM combination with higher link margin, they are moved between CM areas 1204 regardless of the general shape of the CM areas 1204.

Figure 14:
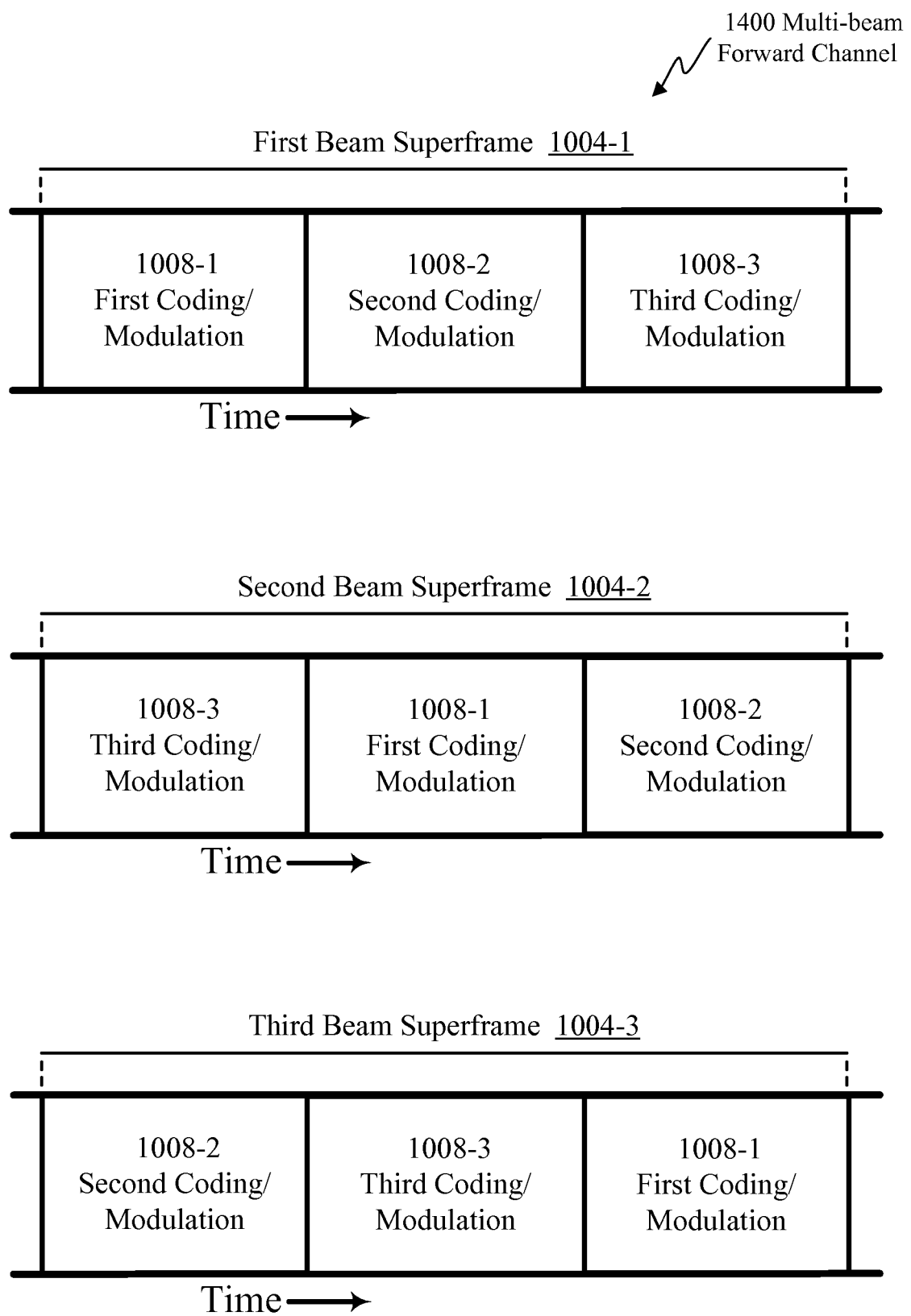
FIG. 14 shows a multi-beam forward channel having three parallel data streams in accordance with one embodiment of the present invention.

Referring next to FIG. 14, a multi-beam forward channel 1400 according to an embodiment of the present invention is shown as three parallel data streams. Each data stream uses a superframe 1004 structure, but other embodiments may not use superframes. Each superframe 1004 is shown with a first, second and third modcode schemes 1008. These are generally equal in temporal size in this embodiment, but other embodiments could vary the size according to the bandwidth usage of the STs 130 that are part of each modcode scheme 1008. For example, the first modcode scheme 1008-1 could be 32APSK 8/9, the second modcode scheme 1008-2 could be 16APSK 3/4, and the third modcode scheme 1008-3 could be 8APSK 2/3. Other modcode schemes other than in FIG. 2B can also be used.

The three spot beams corresponding to these parallel data streams may be adjacent to each other. A particular ST 130 assigned with a particular modcode scheme 1008 will not see the same modcode scheme 1008 used on an adjacent beam in an overlapping way. Other embodiments could have partial overlap between adjacent beams. Some embodiments could avoid overlap between some modcode schemes 1008 while allowing more overlap on others. For example, the center of the spot beam would likely use the highest data rate, but is also least likely to have any overlap. The CM scheme corresponding to the center of the spot beam could tolerate more overlap. The first data packet and at least part of the second data packet are encapsulated in the same frame. The first and second data packets use different modcodes because of varying signal qualities. For example, the signal quality is likely to be better near the center of a beam as there would likely be less overlap with adjacent beams using the same frequency.

Figure 15:
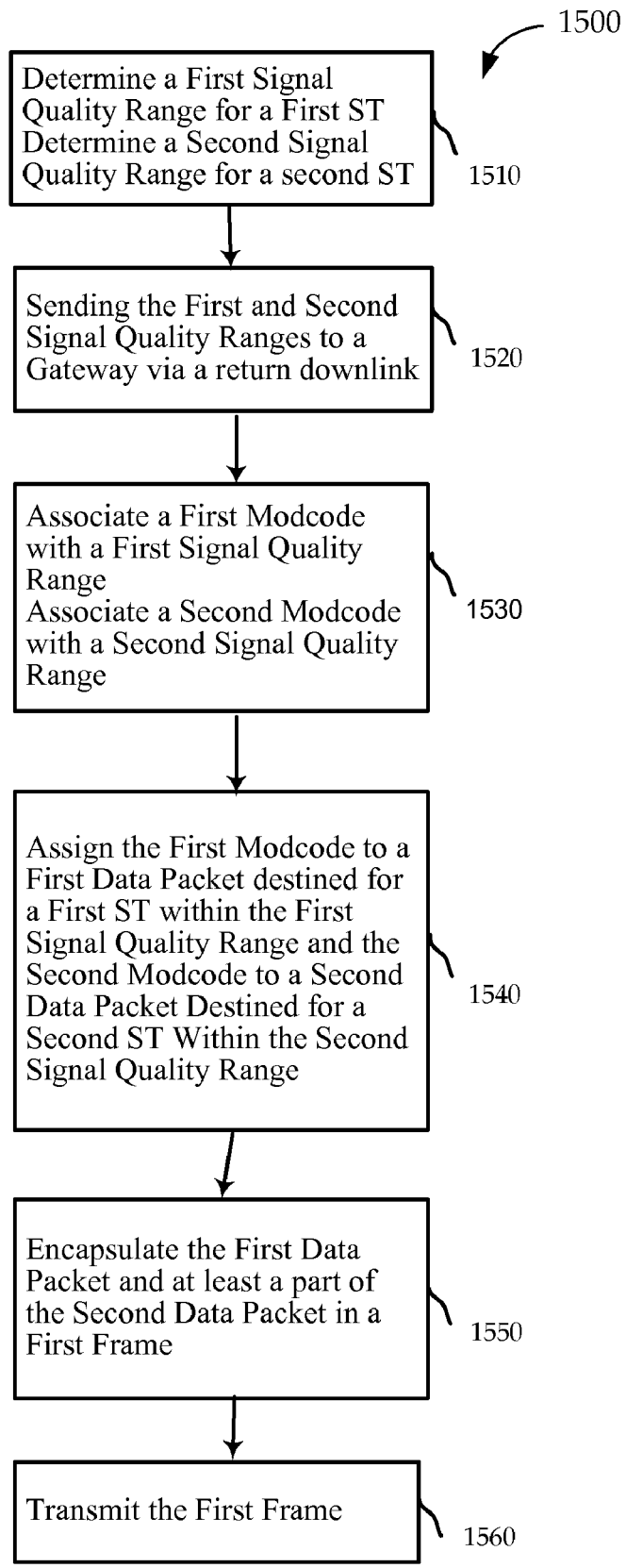
FIG. 15 shows a method of implementing adaptive coding and modulation for maximizing a unicast spot beam capacity in accordance with one embodiment of the present invention.

Referring next to FIG. 15, a process for implementing adaptive coding and modulation in accordance with an embodiment of the present invention is shown. At process step 1510, a first subscriber terminal (ST) determines a first signal quality range, and a second ST determines a second signal quality range. The first and second STs may be located within a first spot beam, or they may be located at the intersection of the first spot beam with other adjacent beams. In one embodiment, the signal quality range may be associated with a signal to noise ratio (SNR) and/or a carrier to interference ratio (C/I) at the VSAT input of the subscriber terminal residing at the location r for a predetermined BER or PER.

At process step 1520, the SNR and/or C/I obtained from the location r is sent to gateway 115 via satellite 105 using the return downlink 140. At process 1530, gateway 115 associates a first modcode to the first signal quality range and a second modcode to the second signal quality range.

At process step 1540, gateway 115 receives a first data packet destined for the first ST within the first signal quality range and assigns the first modcode to the first data packet. At process step 1540, the gateway 115 may also receive a second data packet destined for the second ST within the second signal quality range and assign the second modcode to the second data packet. At process step 1550, gateway 115 encapsulates the first data packet encoded and modulated with the first modcode and at least a part of the second data packet encoded and modulated with the second modcode in a first frame. At process step 1560, gateway 115 transmits the first frame to the first spot beam via satellite 105.

A number of variations and modifications of the disclosed embodiments can also be used. For example, the gateways could support multiple colors to reduce the number of feeder links. LEO, GEO satellite orbits, or cellular towers could be used. Further, the invention is not meant to be limited to only the forward link or only the return link. Some embodiments may use overlapping frequencies on one or both of the forward and return link.

Maximizing Outbound Capacity

According to at least one embodiment of the present invention, the data-carrying capacity of the service spot beams (referred to as outbound capacity) as measured in bits-per-second per Hertz (bps/Hz) may be altered by adjusting certain system parameters. Indeed, the outbound capacity can be maximized by selecting system parameters appropriately. Such system parameters include the number of "colors" of frequency and polarization combinations, as well as the amount of beam spacing.

Just as a specific example, a satellite system may have a "bent pipe" feeder link, a single carrier per traveling wave tube amplifier (TWT), 417 Mega symbols per second (Msps) time division multiplexing (TDM) outbound, operating at 0 dB output back off (OBO). Such a satellite system may specify a beam pattern that uses (1) either 4-color or 7-color frequency and polarization combination and (2) an amount of beam spacing defined according to a particular roll-off value at the cross-over point (also referred to as the triple point). These system parameters may be altered to increase the outbound capacity of the system. The frequency re-use pattern may be assumed to be uniformly distributed. That is, the re-use pattern may be regular in structure. Other system parameters such as number of beams, while they can affect performance, may not represent a design tradeoff specific to data-carrying capacity. In this example, use of either a 4-color or 7-color frequency and polarization combination may result in an outbound capacity that is not optimized and can be greatly improved. For instance, a 1-color frequency and polarization beam pattern may result in a higher outbound capacity.

Maximization of outbound capacity may be defined in different ways. According to one embodiment of the invention, for a satellite system that does not utilize adaptive coding and modulation (ACM), what is maximized may be the outbound capacity as experienced at the worst-case location within a spot beam. This is because in such a non-ACM system, there is only one outbound capacity, and it is determined by a particular selection of modulation rate and coding that accommodates the signal quality experienced at the worst-case location within a spot beam. Here, it is this worst-case outbound capacity that is maximized. For example, this maximization may be achieved by maximizing the ratio of symbol energy to noise and interference, $E_s/(N_0+I_0)$, where $E_s/N_0$ represents the thermal symbol energy to thermal noise ratio, and C/I represents the spot beam carrier to interference ratio.

According to another embodiment of the invention, for a satellite system that utilizes adaptive modulation and coding (ACM), what is maximized may be the average outbound capacity as experienced at all subscriber terminal locations within a spot beam. This is because in such an ACM system, there may be different outbound capacities experienced by different subscriber terminals within the spot beam, resulting from different selections of modulation rate and coding used at different subscriber locations within the spot beam. Here, it is the average of these different outbound capacities that is maximized. For example, this maximization may be achieved by finding the symbol energy to thermal noise ratio $E_s/N_0$ and $E_s/I_0$ for every subscriber terminal location within the spot beam, then maximizing the capacity averaged over the entire beam. Furthermore, if the user distribution over the service spot beam is known, it may be worthwhile to maximize a weighted average capacity that takes into account the user distribution.

Specific calculations for such "worst-case" and "average" capacity are described in illustrative equations presented below. First, a "standardized" signal-to-noise ratio referred to as $(E_s/N_0)^*$ is defined as the signal-to-noise ratio experienced by a subscriber terminal at the beam center, assuming a single-color frequency re-use beam pattern (L=1):

$$\left(\frac{Es}{No}\right)^* = SNR \text{ to a terminal at beam center assuming } L = 1 \quad (1)$$

This may be a constant value for a particular system. For example, in one embodiment of the present invention, the standard signal-to-noise ratio $(E_s/N_0)^*$ to a terminal at the beam center for a one-color pattern (L=1) may be about 6 dB with a 67 cm VSAT.

Next, the signal-to-noise ratio $$\frac{Es}{No}(r)$$

and the signal-to-interference ratio $$\frac{C}{I}(r)$$

are each defined as function of the location, r, within a beam j:

$$\frac{Es}{No}(r) = L \cdot |h_j|^2 \cdot \left(\frac{Es}{No}\right)^* \quad (2)$$

$$\frac{C}{I}(r) = \frac{|h_j|^2}{\sum_i |h_i|^2} \quad (3)$$

where $|h_j|^2$ is the "normalized gain," which is defined as the beam gain relative to the maximum gain. L is the number of color patterns. Here, the signal-to-noise ratio varies linearly with the number of colors (L) because it is assumed that the satellite is power limited and the total power radiated per beam is constant, regardless of the bandwidth of the beam (which is related to the number of colors employed). Under this assumption, a system employing 4 colors has a bandwidth per beam that is 25% of the bandwidth per beam of a system employing 1 color. Hence the EIRP density, dBW/Hz, is 4 times as large for a 4 color system than a 1 color system which results in the signal-to-noise ratio being 4 times as large for the 4 color system than the 1 color system.

Location-specific capacity may be expressed as either the Shannon capacity or the Waveform based capacity. These two types of capacity can each be defined as a function of r and can be expressed in terms of an intermediate expression γ(r):

$$[\gamma(r)]^{-1} = \left[\frac{Es}{No}(r)\right]^{-1} + \left[\frac{C}{I}(r)\right]^{-1} \quad (4)$$

$$\text{Capacity}(r) = \log_2(1 + \gamma(r)) \quad \text{(Shannon Capacity)} \quad (5)$$

$$\text{Capacity}(r) = f(\gamma(r)) \quad \text{(Waveform based capacity)} \quad (6)$$

where f(γ) is a function that maps signal-to-noise ratio (γ) into capacity in bps/Hz and is related to the library of waveforms (modulation and codepoint) used in the forward link.

Average capacity can be found by integrating the location-specific capacity over locations within a beam. This may be defined as:

$$C_{avg}(j) = \frac{1}{A_j} \int_r \text{Capacity}(r) dr \quad (7)$$

where $A_j$ is the area covered by beam j. This represents the average capacity over the area covered by beam j.

Figure 16:
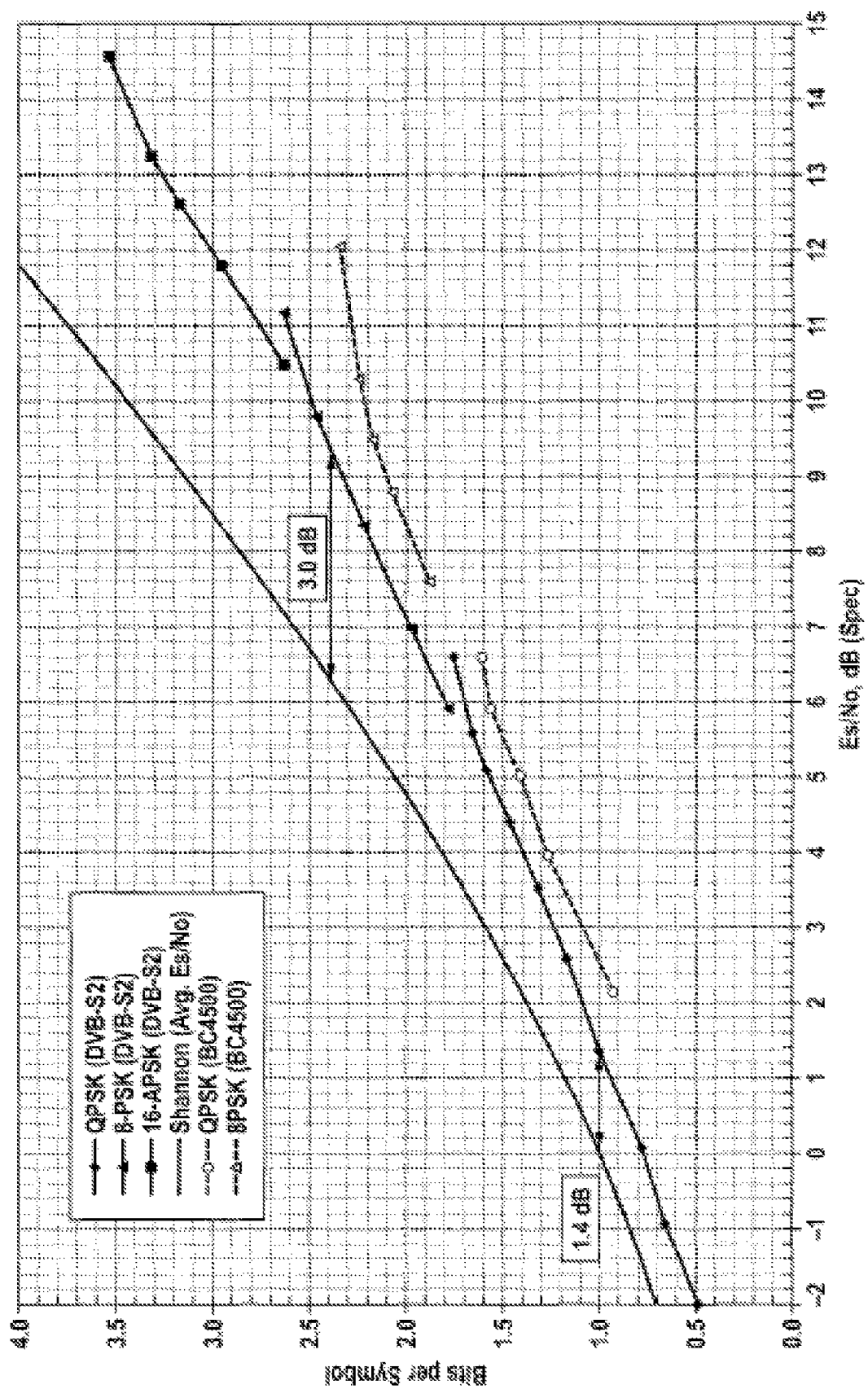
FIG. 16 graphically illustrates the Shannon capacity as well as various waveform based capacities as a function of the signal-to-noise ratio $E_s/N_0$.

FIG. 16 graphically illustrates the Shannon capacity as well as various waveform based capacities as a function of the signal-to-noise ratio $E_s/N_0$. As depicted in FIG. 16, architectures requiring low FEC code rates generally perform closer to theoretical limits as represented by the Shannon capacity. For example, the capacity of a waveform utilizing QPSK modulation and DVB-S2 coding is 1.4 dB from the theoretical limit (at $E_s/N_0$ around 0 dB). By contrast, the capacity of a waveform utilizing 8-PSK modulation and DVB-S2 coding is 3 dB away from the theoretical limit (at $E_s/N_0$ around 7 dB).

Figure 17:
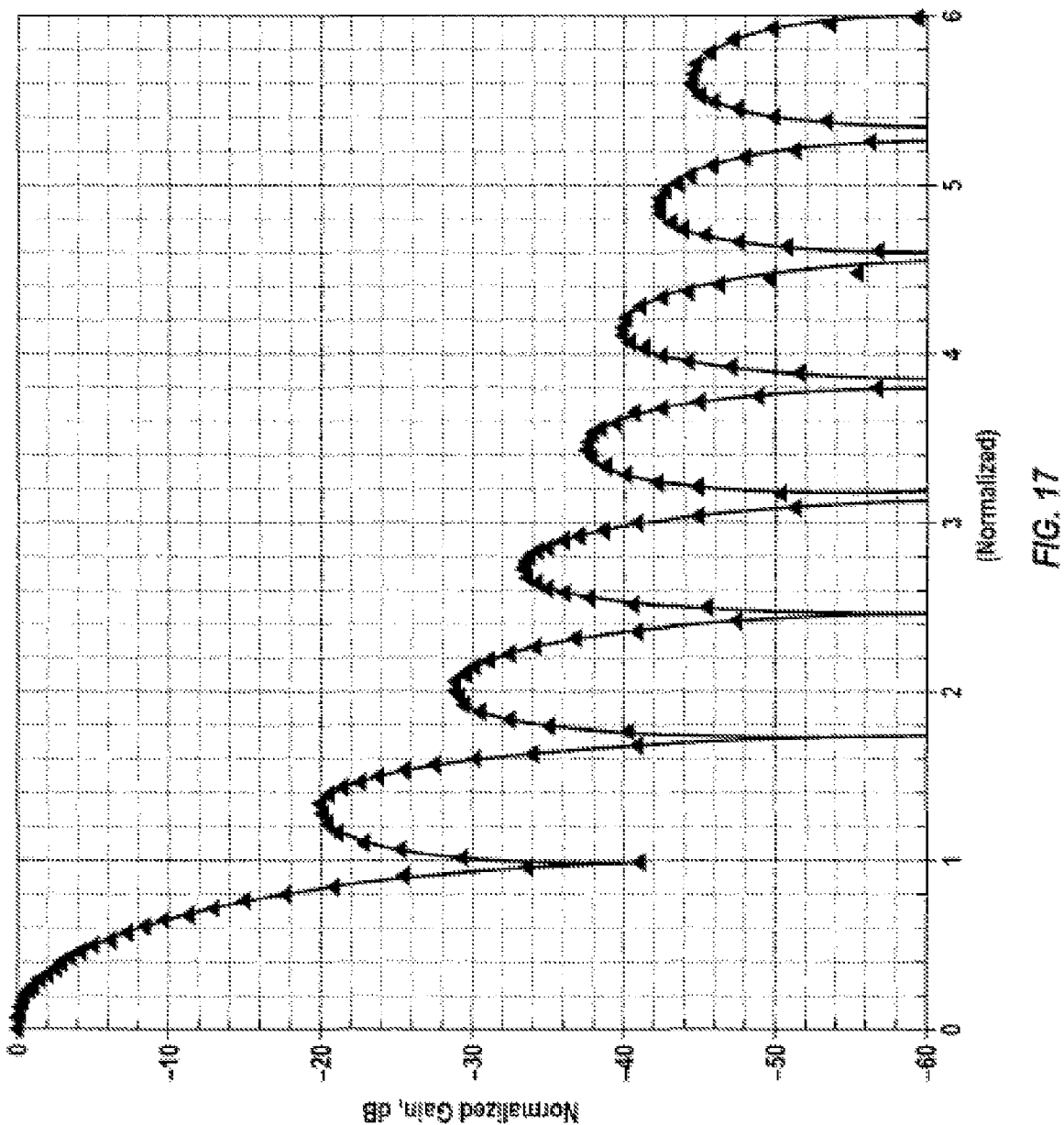
FIG. 17 graphically illustrates an example of the normalized gain $|h_j|^2$ as function of the location, r, within a beam.

FIG. 17 graphically illustrates an example of the normalized gain $|h_j|^2$ as function of the location, r, within a beam.

Here, the normalized gain is calculated for a system employing a circular aperture with 10dB taper in accordance with one embodiment of the present invention.

According to an embodiment of the present invention, the capacity of the system may be systematically calculated for different choices of system parameter settings. Both types of capacity may be calculated—"worst-case" and "average" capacity. As discussed previously, "worst-case" capacity may be a more appropriate measure of capacity for non-ACM systems. "Average" capacity may be a more appropriate measure of capacity for ACM systems. The systems parameters that may be varied include: (1) the number of "colors" (L) used in the frequency and polarization beam pattern, (2) the amount of beam spacing, as measured by the roll-off value at the cross-over point (also referred to as the triple point). These capacity calculations may also be performed at various levels of signal-to-noise ($E_s/N_0$) ratio. By plotting the capacity of the system as these system parameters are varied, a picture begins to emerge to indicate how capacity is affected by the choices made in different parameter settings. Figures described below represent such pictures for selected scenarios of system parameter choices.

Figure 18A:
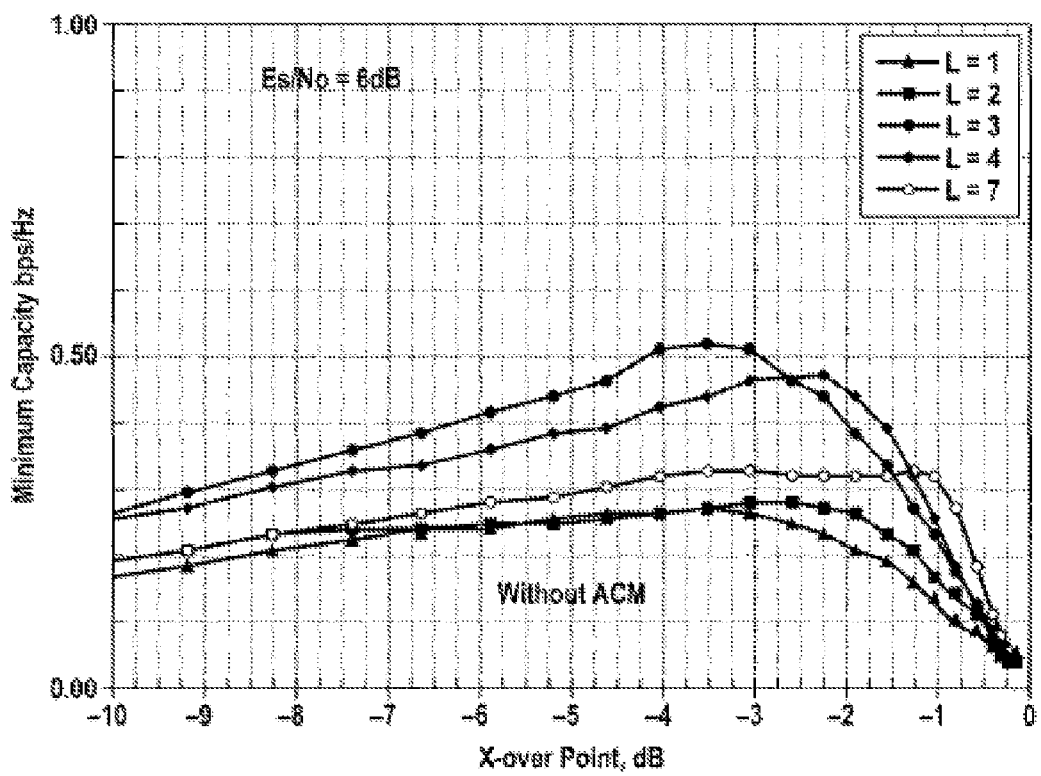
FIG. 18A shows the minimum capacity (bps/Hz) plotted against the amount of beam spacing, for a satellite system operated without ACM, at a "standardized" signal-to-noise $(E_s/N_0)^*=6$ dB.
Figure 18B:
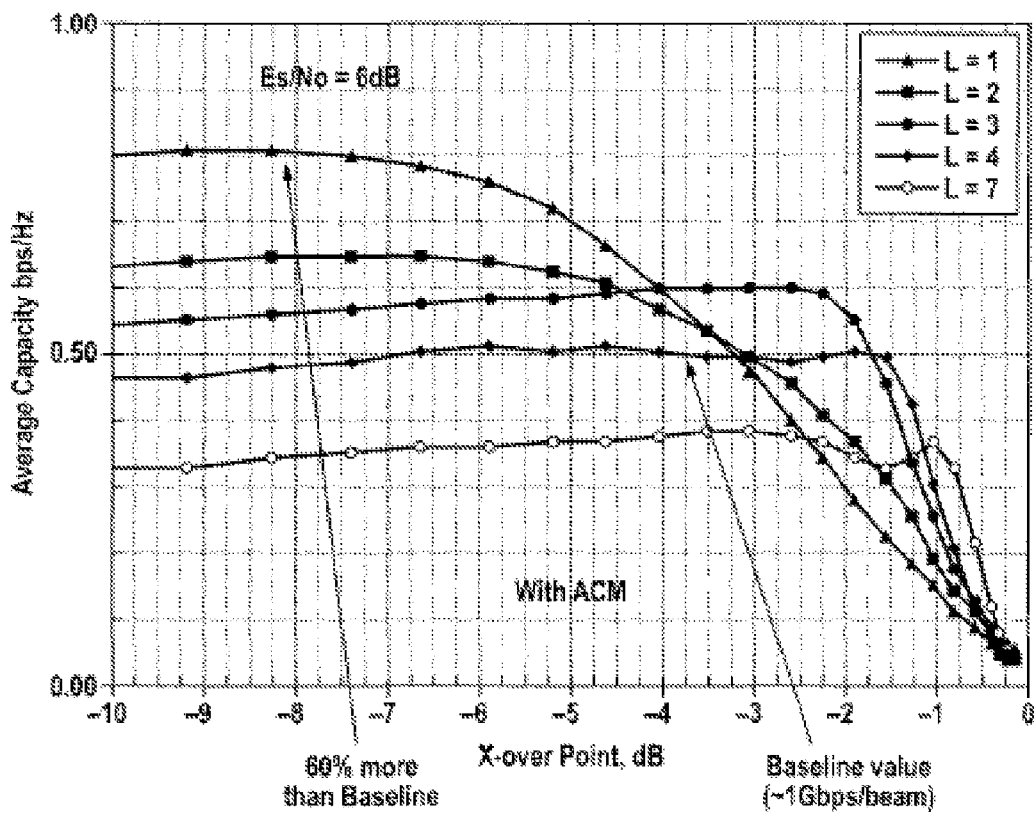
FIG. 18B shows the average capacity plotted against the amount of beam spacing, for a satellite system operated with ACM, at $(E_s/N_0)^*=6$ dB.

FIG. 18A shows the minimum capacity (bps/Hz) plotted against the amount of beam spacing, for a satellite system operated without ACM, at a "standardized" signal-to-noise $(E_s/N_0)^*=6$ dB. The plot is repeated for different selections of the number of colors (L=1, 2, 3, 4, 7). Here, the minimum capacity corresponds to the "worst case" capacity referred to previously. For comparison, FIG. 18B shows the average capacity plotted against the amount of beam spacing, for a satellite system operated with ACM, at $(E_s/N_0)^*=6$ dB. The plot is again repeated for different selections of the number of colors (L=1, 2, 3, 4, 7). The beam capacity is obtained by multiplying the average capacity (bps/Hz) by the total system bandwidth. For a system bandwidth of 2 GHz, the baseline capacity is about 1 Gbps per beam. In FIG. 18B, a baseline is chosen as a four-color system. As it can be seen in this figure, a one-color satellite system may have 60 percent more average capacity than a four-color satellite system, up to the crossover point of about −7 dB.

Figure 19A:
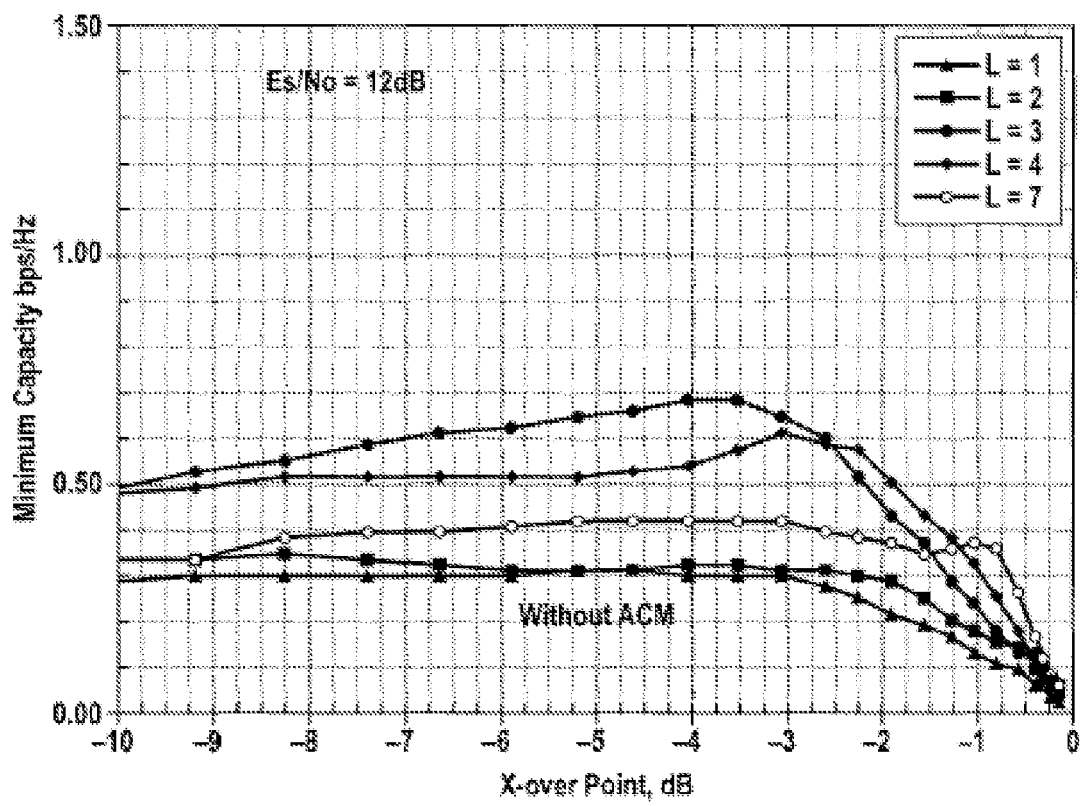
FIG. 19A shows the minimum capacity (bps/Hz) plotted against the amount of beam spacing, for a satellite system operated without ACM, at $(E_s/N_0)^*=12$ dB.
Figure 19B:
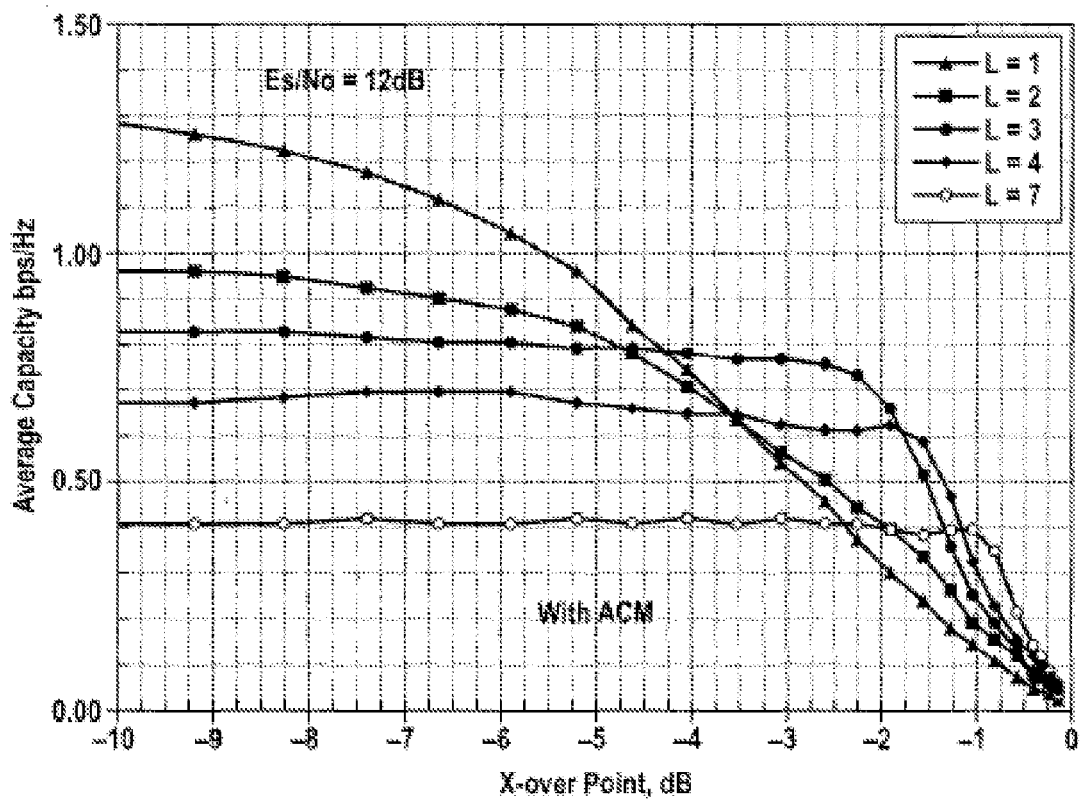
FIG. 19B shows the average capacity (bps/Hz) plotted against the amount of beam spacing, for a satellite system operated with ACM, at $(E_s/N_0)^*=12$ dB.

FIG. 19A shows the minimum capacity (bps/Hz) plotted against the amount of beam spacing, for a satellite system operated without ACM, at $(E_s/N_0)^*=12$ dB. The plot is repeated for different selections of the number of colors (L=1, 2, 3, 4, 7). For comparison, FIG. 19B shows the average capacity (bps/Hz) plotted against the amount of beam spacing, for a satellite system operated with ACM, at $(E_s/N_0)^*=12$ dB. The plot is repeated for different selections of the number of colors (L=1, 2, 3, 4, 7).

Figure 20A:
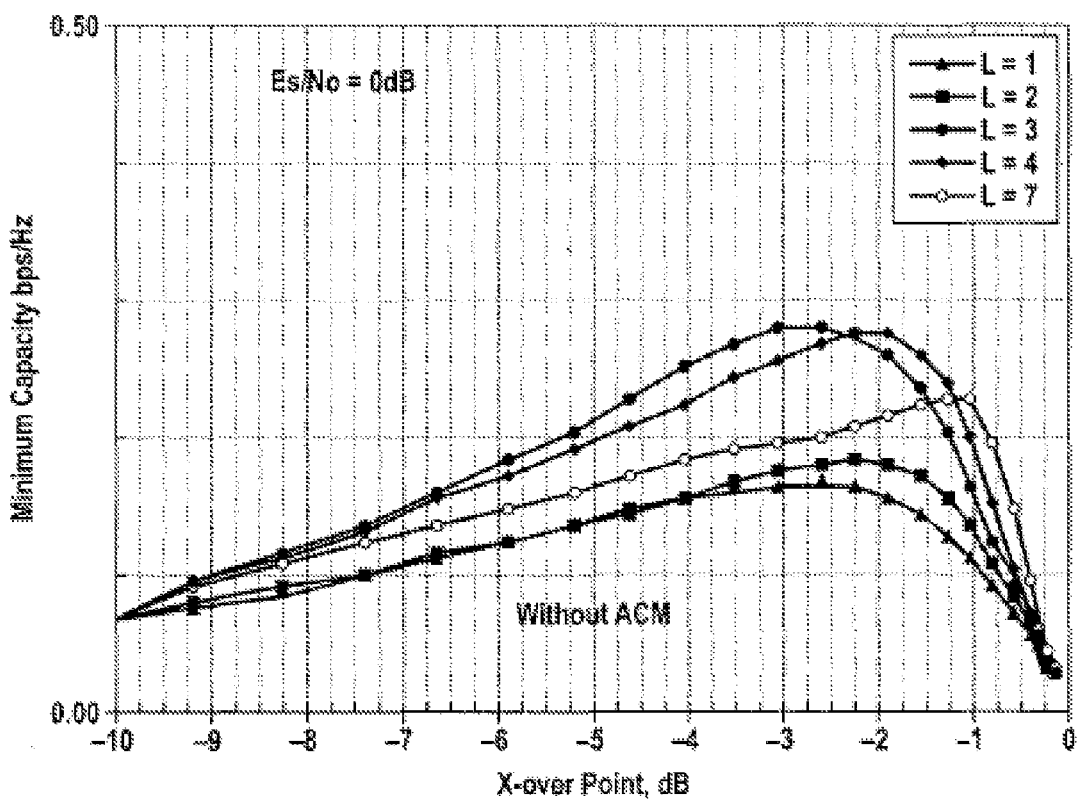
FIG. 20A shows the minimum capacity (bps/Hz) plotted against the amount of beam spacing, for a satellite system operated without ACM, with $(E_s/N_0)^*=0$ dB.
Figure 20B:
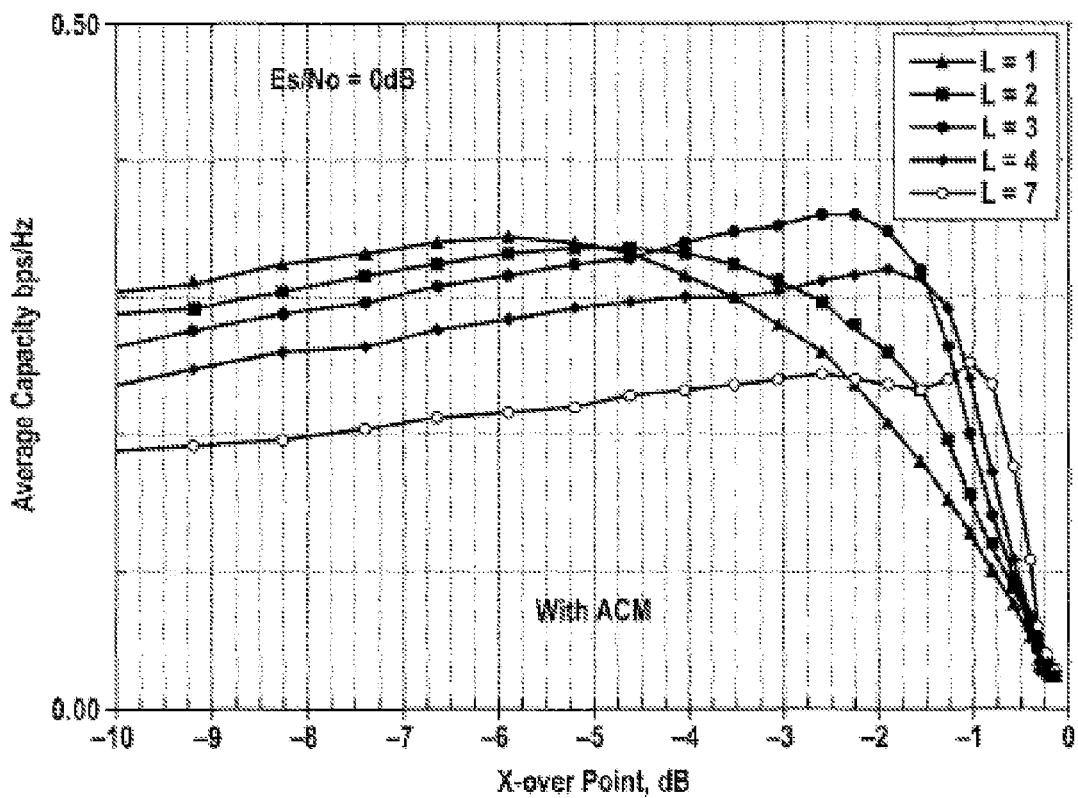
FIG. 20B shows the average capacity (bps/Hz) plotted against the amount of beam spacing, for a satellite system operated with ACM, at $(E_s/N_0)^*=0$ dB.

FIG. 20A shows the minimum capacity (bps/Hz) plotted against the amount of beam spacing, for a satellite system operated without ACM, with $(E_s/N_0)^*=0$ dB. The plot is repeated for different selections of the number of colors (L=1, 2, 3, 4, 7). For comparison, FIG. 20B shows the average capacity (bps/Hz) plotted against the amount of beam spacing, for a satellite system operated with ACM, at $(E_s/N_0)^*=0$ dB. The plot is repeated for different selections of the number of colors (L=1, 2, 3, 4, 7).

Figure 21A:
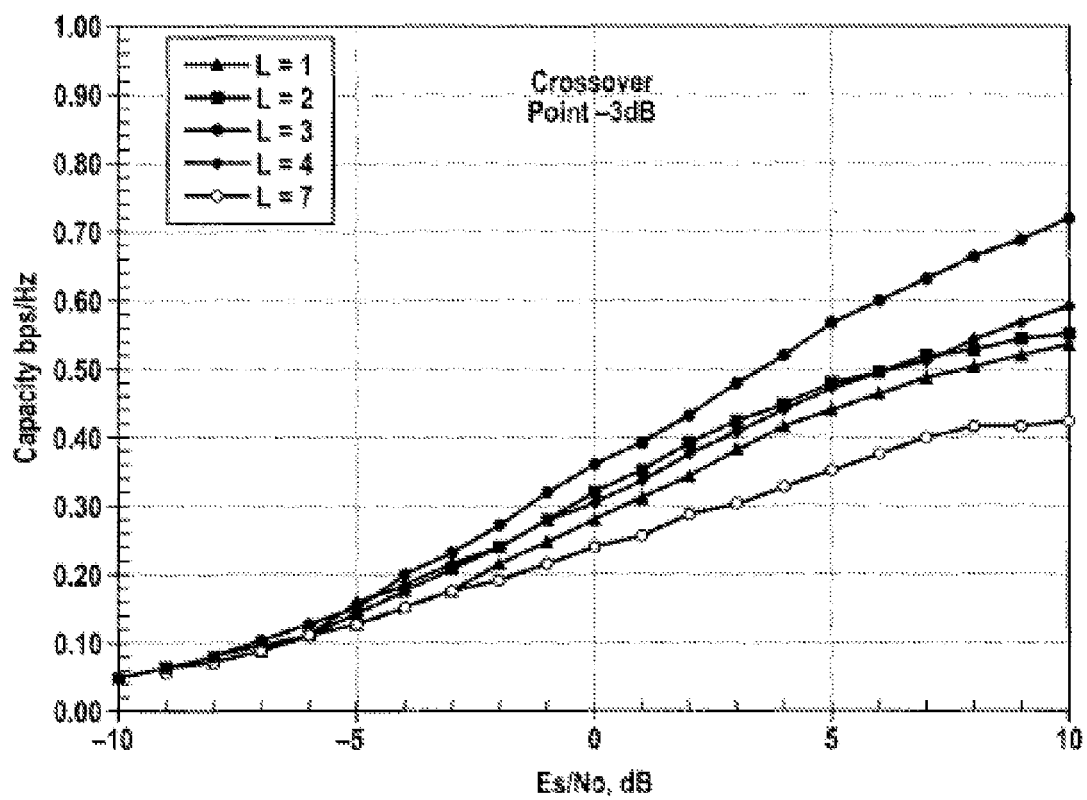
FIG. 21A shows the capacity in bps/Hz per beam plotted against the signal-to-noise ratio $E_s/N_0$, for a satellite system with beam spacing characterized by a roll-off value of −3 dB at the cross-over point.
Figure 21B:
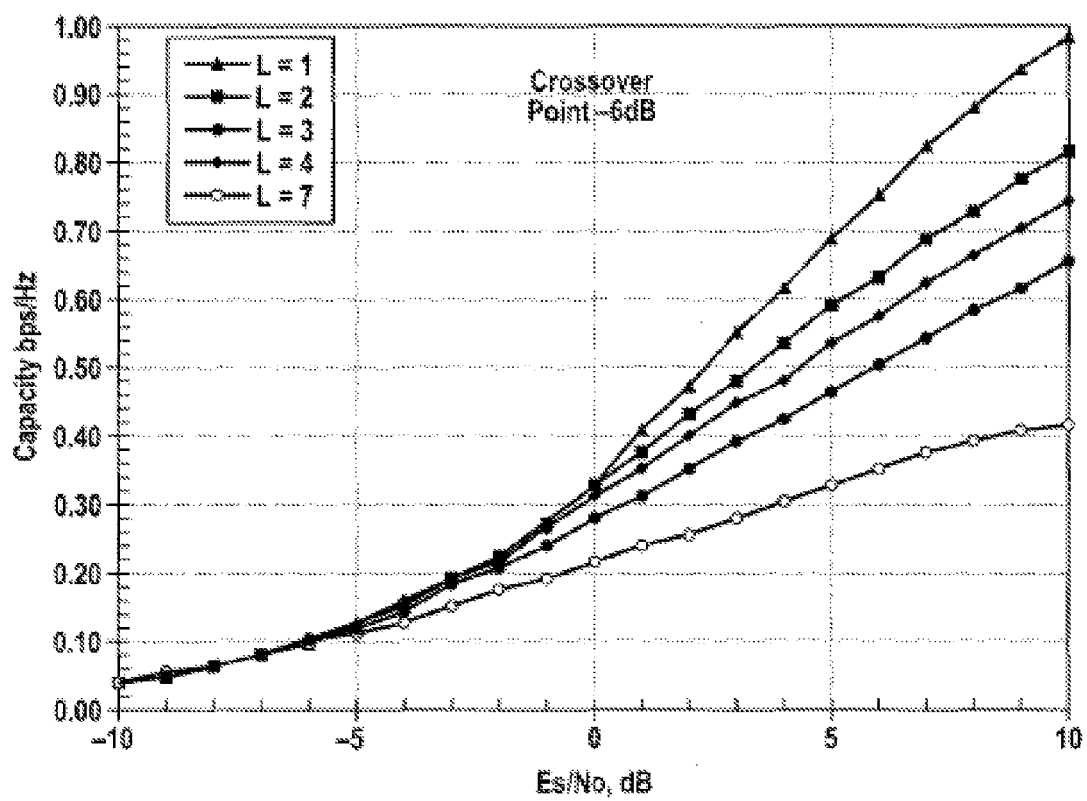
FIG. 21B shows the capacity in bps/Hz per beam plotted against $E_s/N_0$, for a satellite system with beam spacing characterized by a roll-off value of −6 dB at the cross-over point.

FIG. 21A shows the capacity in bps/Hz per beam plotted against the signal-to-noise ratio $E_s/N_0$, for a satellite system with beam spacing characterized by a roll-off value of −3 dB at the cross-over point. FIG. 21B shows the capacity in bps/Hz per beam plotted against $E_s/N_0$, for a satellite system with beam spacing characterized by a roll-off value of −6 dB at the cross-over point.

Figure 22:
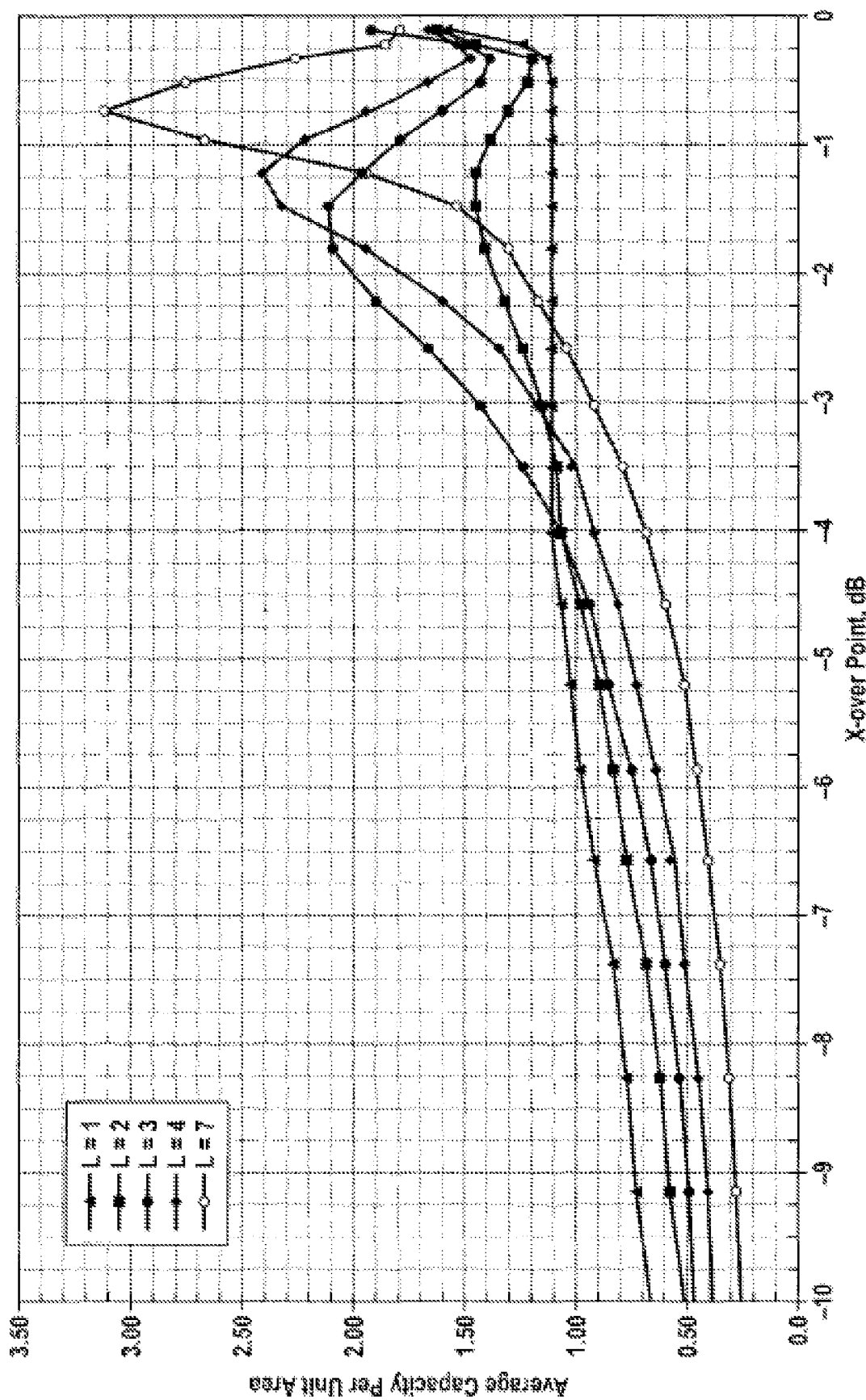
FIG. 22 illustrates the density (defined as average capacity per unit area) for satellite systems having different selections of the number of colors (L=1, 2, 3, 4, 7).

FIG. 22 illustrates the density (defined as average capacity per unit area) for satellite systems having different selections of the number of colors (L=1, 2, 3, 4, 7). Maximizing the density requires the use of smaller beam spacing. One way of achieving smaller beam spacing is the use of more colors, which results in the reduction of the C/I. As it can be seen, maximizing density will maximize the capacity into a geographic hot spot, which is bigger than 1 spot beam, but provides less overall capacity.

In one embodiment of the present invention, the total capacity may be optimized by adopting a single-color frequency re-use beam pattern, along with beam spacing characterized by a roll-off value of less than −6 dB at the crossover point. Such a single-color system may achieve an outbound capacity increase of 60 percent over the four-color baseline system without an increase in bus power or an increase in bandwidth. A 60-beam single-color system with beam spacing of 0.47° (vs. 0.32°) can cover twice the area of the full continental United States of America (FULL CONUS). And the capacity can be increased further by reducing coverage areas (the capacity can reach about 2 Gbps per beam with the same coverage area and bus power as the four-color system). However, the single-color system does need to increase the payload TWTs from 60×90 Watts to 240×23 Watts and requires 40 gateways for a total bandwidth of 120 GHz (60 beams×2 GHz).

In some other embodiments, the four-color system may get a better capacity density for hot spots when the crossover point is about −2dB. The four-color system is not very sensitive to crossover points and has essentially the same capacity for crossover points from −1.5 dB to −7 dB (FIG. 22).

Figure 23:
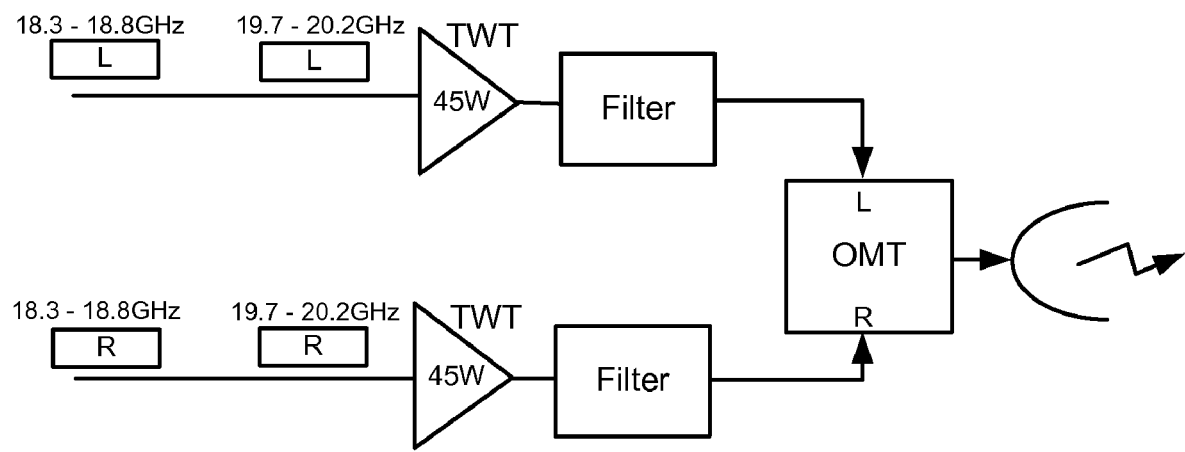
FIG. 23 presents a four-color system in accordance with one embodiment of the invention.

FIG. 23 presents a four-color system in accordance with one embodiment of the invention. This system employs two 45 Watt TWTs per beam for a total of 90 Watt, the same power TWT used in a known four-color baseline system. The four-color baseline system may use two frequency ranges 18.3 to 18.8 GHz and 19.7 to 20.3 GHz, each having a 500 MHz bandwidth. The baseline system may further polarize the two frequency ranges with a left and right polarization to achieve the four colors. Due to channel locations, intermodulation products fall out of band. The orthomode transducer (OMT) combines the signals from the two 45 W TWTs into s single waveguide port with the proper waveguide modes at the two frequency ranges so that a single feed horn may be used to illuminate the spot beam. The OMT may contribute an 1 dB additional suppression loss at 0 dB OBO, which is defined as the measured power ratio in dB between the unmodulated carrier at saturation and the modulated carrier.

In one embodiment of the present invention, the four-color system is used as the baseline with the following parameters: 2.8 m aperture, beam spacing=0.32°, crossover point=−3.5 dB, and a power flux density (PFD) less than or equal −119 dBW/MHz-m². The single-color system may have the following parameters to cover the same area: 4.1 m aperture, beam spacing=0.32°, crossover point=−8 dB; the bigger reflector will provide about 3.3 dB more gain, sufficiently more than needed to compensate for the 1 dB additional suppression loss due to the OBO. There may be two options for utilizing this additional gain. Under the first option, the additional gain is taken as a payload power reduction; for example, reduce TWT power by 2.3 dB. The transmission power will be 2×26 W TWTs per beam (or 3.18 kW vs. 5.4 kW for the four-color system). The beam capacity is about 1.6 Gbps, and the PFD per pole is less than −125 dBW/MHz-m². Under the second option, the additional gain is taken as more capacity due to the increase of $E_s/N_0$ by 2.3 dB. The transmission power is 2×45 W TWTs per beam, the same as the four-color system; but the achieved capacity is now 1.96 Gbps, and the PFD per pole is less than −122.7 dBW/MHz-m².

In another embodiment of the present invention, the single-color system uses a 3.6 m aperture, beam spacing=0.32°, crossover point=−6 dB; the bigger reflector provides about 2.2 dB more gain, sufficiently more than needed to compensate for the 1 dB additional suppression loss due to the OBO. Here again there may be two options for utilizing this additional gain. Under the first option, the additional gain of 1.2 dB is taken as a payload power reduction; for example, reduce TWT power by 1 dB. The total transmission power of the system is then 60×68 W TWTs. The beam capacity is about 1.28 Gbps, and the PFD per pole is less than −122 dBW/MHz-m². Under the second option, the additional gain is taken as more capacity due to the increase of $E_s/N_0$ by 1 dB. The transmission power is 60×90 W TWTs, the achieved beam capacity is 1.40 Gbps, and the PFD per pole is less than −120.8 dBW/MHz-m².

In another embodiment of the present invention, a two-color system uses a 3.6 m aperture, beam spacing=0.32°, crossover point=−6 dB, and a service link bandwidth of 500 MHz. The power is 60×54 W TWTs due to the 2.2 dB gain of the bigger reflector. The $E_s/N_0$ is 9 dB due to reduced system bandwidth; and the PFD is less than −119 dBW/MHz-m². The beam capacity is about 0.77 Gbps (about 77 percent of the four-color system). One way to increase beam capacity is to increase PFD to −118 dBW/MHz-m² as extra power is available (60×68W TWTs); the $E_s/N_0$ is 10 dB; and the beam capacity is 0.82 Gbps (82 percent of the four-color baseline system).

In another embodiment of the present invention, the system uses a 4.1 m aperture, beam spacing=0.32°, crossover point=−8 dB for a high capacity design. The 4.1 m aperture provides 3.3 dB more gain with no additional suppression loss. The power is 120×45 W TWTs (the TWT has the same power as those used in the four-color baseline system). The $E_s/N_0$ is 6 dB (the baseline)+3 dB (bandwidth)+3.3 dB (antenna gain) for a total of 12.3 dB. The PFD is less than −118.7 dBW/MHz-m², and the beam capacity is about 1.24 Gbps (24 percent more than the baseline system). Even with a 50 percent power reduction of TWTs (22.5 W TWTs), the achieved beam capacity is still 1.05 Gbps.

In yet another embodiment of the present invention, the system uses a 2.8 m aperture, beam spacing=0.47°, crossover point=−8 dB for a high coverage area design (to cover the full continental United States. The power is 120×45 W TWTs (same as the baseline system). The obtained PFD per pole is less than dBW/MHz-m²; the $E_s/N_0$ is 6 dB (the baseline)+3 dB (bandwidth) for a total of 9 dB. The achieved beam capacity is 1.04 Gbps. Even with a 50 percent power reduction of TWTs (22.5 W TWTs), the achieved beam capacity of this system is still 0.8 Gbps.

FIG. 24 provides a summary of different systems 2410 having different number of colors 2420, bandwidth per beam 2425, number of employed gateways 2430, TWT power per beam 2435, number of TWTs per satellite 2440, the payload aperture 2445, maximum PFD per pole 2450, beam spacing 2455, crossover points 2460, achieved beam capacity 2470, and relative comparison to a four-color baseline system LF4 2480. The relative comparison is further divided into capacity 2485, TWT power 2486, satellite link bandwidth 2487, and coverage area 2488.

Interference-Dominated Environment

The present invention makes it possible for satellite communications to be effectively carried out in an interference-dominated environment. Here, the term "interference-dominated" refers to a situation where reception of signals from a spot beam at a subscriber terminal is affected by interference from sources that collectively result in a signal-to-interference ratio C/I, as well as noise at a signal-to-noise ratio C/N, such that the signal-to-interference ratio C/I is less than the signal-to-noise ratio C/N. That is, C/I<C/N. In more serious cases, C/I may be 3 dB or more below C/N. That is, C/I<C/N−3 dB. Numerous factors may compound to create such an interference-dominated environment, which has not confronted previous satellite systems. One factor may be the high number of service spot beams in the system. From the perspective of a subscriber terminal receiving signals from a desired spot beam, interference may come from not only immediately adjacent spot beams, but also from spot beams beyond the immediately adjacent spot beams.

For example, referring to the two-color beam pattern shown in FIG. 4, a subscriber terminal in one particular spot beam may receive interference from the six immediately adjacent spot beams in the beam pattern. Variations in interference may exist, as some of these six immediately adjacent spot beams may have the same color as the desired spot beam and therefore cause more interference than those that have different color as the desired spot beam. In any case, these six immediately adjacent spot beams may not represent the only sources of interference. The twelve spot beams just beyond the six immediately adjacent spot beams may also introduce interference. These twelve spot beams are farther away from the subscriber terminal, but they also contribute to the total interference experienced by the subscriber terminal (although to a lesser extent). Furthermore, the eighteen spot beams just beyond the twelve spot beams mentioned above are yet further away but may nevertheless also introduce interference (although to an even lesser extent). In this manner, all spot beams in the system other than the desired spot beam can potentially contribute, in varying degrees, to the total interference received by the subscriber terminal—and together they increase the overall interference and thus lower the signal-to-interference ratio C/I.

Another factor that may contribute to the presence of an interference-dominated environment is frequency re-use by service spot beams. For instance, even if two adjacent service spot beams utilize different "colors," such two colors may operate in the same frequency range and only differ by polarization. While appropriate equipment is used to isolate signals of different polarizations, perfect isolation may not be achieved. As such, to the extent isolation is not complete, interference from service spot beams having a different polarization but the same frequency range as the desired spot beam may also contribute to further increase the overall interference and thus lower the signal-to-interference ratio C/I.

Yet another factor that may contribute to the presence of an interference-dominated environment is frequency re-use between feeder spot beams and service spot beams. As mentioned previously with reference to FIG. 2, in at least one embodiment of the invention, a feeder link 140 may have a feeder spot beam that is geographically separated from the service spot beams. Such geographic separation theoretically provides the orthogonality needed to isolate the feeder spot beam from the service spot beams. As such, a system according to an embodiment of the present invention may allow the feeder spot beam to re-use the same frequency and polarization as one or more of the service spot beams. This facilitates more efficient frequency utilization. However, as a consequence of this frequency re-use between feeder spot beams and service spot beams, a subscriber terminal receiving signals from a desired service spot beam may be affected by interference coming from a feeder spot beam found at a geographically separated location from the desired service spot beam. The severity of this interference varies depending on how far away the feeder spot beam is located. Such interference from feeder spot beams may also contribute to further increase the overall interference and thus lower the signal-to-interference ratio C/I.

Techniques described above in various embodiments of the invention allow the satellite communications system to operate in such an interference-dominated environment. The novel design of satellite communication system such as those presented here leads to a significant amount of interference from signal sources within the system. Embodiments of the present invention effectively handle such interference levels among spot beams and accomplish efficient communication of data within the interference-dominated environment.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While the invention has been described with respect to exemplary embodiments, one skilled in the art will recognize that numerous modifications are possible. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A satellite comprising:
a power source;
a plurality of amplifiers for generating a plurality of spot beams; and
an antenna for transmitting the plurality of spot beams to illuminate a corresponding plurality of regions on Earth, the plurality of spot beams including a spot beam illuminating a region at least partially overlapping with regions illuminated by one or more neighboring spot beams to result in interference;
wherein the spot beam services a first subscriber terminal located in a first area closer to the center of the region illuminated by spot beam and a second subscriber terminal located in a second area closer to the periphery of the region illuminated by the spot beam;
wherein the spot beam comprises a signal having a first portion sent with a first modcode destined for the first subscriber terminal located in the first area closer to the center of the illuminated region, the signal having a second portion sent with a second modcode destined for the second subscriber terminal located in the second area closer to the periphery of the illuminated region, wherein the first modcode corresponds to a higher data rate than the second modcode; and
wherein modcodes of signals sent to the first and second subscriber terminals are adjusted according to an adaptive modulation and coding (ACM) scheme based on link quality information collected from the first and second subscriber terminals, to mitigate effects of interference from the one or more neighboring spot beams.

2. The satellite of claim 1 wherein the first modcode is selected for transmitting signals to a first plurality of subscriber terminals based on assignment of the first plurality of subscriber terminals to the first area; and wherein the second modcode is selected for transmitting signals to a second plurality of subscriber terminals based on assignment of the second plurality of subscriber terminals to the second area.

3. The satellite of claim 2 wherein the modcode of the at least one of the first plurality of subscriber terminals is re-assigned to the modcode corresponding to the second area in response to link quality information, and consequently, the lower modulation and coding rate is selected for transmitting signals to the re-assigned subscriber terminal.

4. The satellite of claim 2 wherein the modcode of the at least one of the second plurality of subscriber terminals is re-assigned to the modcode corresponding to the first area in response to link quality information, and consequently, the higher modulation and coding rate is selected for transmitting signals to the re-assigned subscriber terminal.

5. The satellite of claim 1 wherein the region illuminated by the spot beam is divided among the first area closer to the center, the second area closer to the periphery, and at least one intermediate region between the center and the periphery of the illuminated region.

6. The satellite of claim 1 wherein the signal has a frame structure and comprises a frame containing the first portion destined for the first subscriber terminal and the second portion destined for the second subscriber terminal.

7. The satellite of claim 1 wherein the plurality of spot beams are arranged in a non-uniform beam pattern to accommodate a population gradient.

8. The satellite of claim 1 wherein each of the plurality of amplifiers is a traveling wave tube amplifier (TWTA).

9. A satellite system comprising:
a gateway;
a satellite for generating a plurality of spot beams based on signals originating from the gateway, the plurality of spot beams including a spot beam illuminating a region at least partially overlapping with regions illuminated by one or more neighboring spot beams; and
a plurality of subscriber terminals serviced by the plurality of spot beams, including a first subscriber terminal located in a first area closer to the center of the region illuminated by the spot beam and a second subscriber terminal located in a second area closer to the periphery of the region illuminated by the spot beam;
wherein the spot beam comprises a signal having a first portion sent with a first modcode destined for the first subscriber terminal located in the first area closer to the center of the illuminated region, the signal having a second portion sent with a second modcode destined for the second subscriber terminal located in the second area closer to the periphery of the illuminated region, wherein the first modcode corresponds to higher data rate than the second modcode; and
wherein modcodes of signals sent to the first and second subscriber terminals are continually adjusted according to an adaptive modulation and coding (ACM) scheme based on link quality information collected from the first and second subscriber terminals, to mitigate effects of interference from the one or more neighboring spot beams.

10. A method for configuring a satellite comprising:
selecting a spot beam pattern comprising a plurality of spot beams arranged in a pattern to cover a geographic area, the spot beam pattern producing interference between spot beams;
calculating different signal qualities at different subscriber terminals positioned at various locations within a spot beam belonging to the spot beam pattern;
modeling an average capacity for the spot beam from location-specific capacities for the different subscriber terminals positioned at various locations within the spot beam, wherein the location-specific capacities are determined from the different signal qualities at the different subscriber terminals; and
selecting at least one satellite system parameter of the satellite based at least in part on the average capacity for the spot beam.

11. The method of claim 10 wherein the location-specific capacities for the different subscriber terminals are determined based on particular selections of modulation and coding used at the different subscriber terminals in view of the different signal qualities for the different subscriber terminals.

12. The method of claim 11 wherein the particular selections of modulation and coding are adjusted according to an adaptive coding and modulation (ACM) scheme.

13. The method of claim 10 wherein the average capacity is a weighted average capacity based on a known user distribution over the spot beam.

14. The method of claim 10 wherein the at least one satellite system parameter is selected to improve the average capacity for the spot beam compared to other choices of the at least one satellite system parameter.

15. The method of claim 10 wherein the at least one satellite system parameter is selected to maximize the average capacity for the spot beam.

16. The method of claim 10 wherein the at least one satellite system parameter comprises a number of frequency and polarity combinations used in the spot beam pattern.

17. The method of claim 10 wherein the at least one satellite system parameter comprises an amount of beam spacing used in the spot beam pattern.

18. The method of claim 17 wherein the amount of beam spacing is expressed in terms of a beam cross-over point.

19. The method of claim 10 wherein each signal quality comprises a signal to interference ratio.

20. The method of claim 10 wherein each signal quality comprises a signal to noise ratio.

21. A satellite designed by the method of claim 10.

* * * * *